United States Patent [19]

Schlecht et al.

[11] Patent Number: 4,788,634
[45] Date of Patent: Nov. 29, 1988

[54] RESONANT FORWARD CONVERTER

[75] Inventors: Martin F. Schlecht, Lexington; Leo F. Casey, Cambridge, both of Mass.

[73] Assignee: Massachusetts Institute of Technology, Cambridge, Mass.

[21] Appl. No.: 65,016

[22] Filed: Jun. 22, 1987

[51] Int. Cl.[4] .......................................... H02M 3/335
[52] U.S. Cl. ........................................ 363/21; 363/48; 363/75; 363/131; 323/266
[58] Field of Search ....................... 363/20, 21, 47, 48, 363/75, 131; 323/266

[56] References Cited

U.S. PATENT DOCUMENTS

| | | | |
|---|---|---|---|
| 3,919,656 | 11/1975 | Sokal et al. | 330/51 |
| 3,971,975 | 7/1976 | Genuit | 363/47 |
| 4,415,959 | 11/1983 | Vinciarelli | 363/21 |
| 4,605,999 | 8/1986 | Bowman et al. | 363/131 |
| 4,685,041 | 8/1987 | Bowman et al. | 363/48 |
| 4,688,158 | 8/1987 | Peterson et al. | 363/21 |

OTHER PUBLICATIONS

Kwang-Hwa Liu, Ramesh Oruganti, and Fred C. Lee, "Resonant Switches—Topologies and Characteristics", *IEEE Power Electronics Specialist Conference*, Toulouse, France, Jun. 24–28, 1985, pp. 106–116.

Kwang-Hwa Liu and Fred C. Lee, "Zero-Voltage Switching Technique in DC/DC Converters", *IEEE PESC 1986 Record*, pp. 58–70.

Nathan O. Sokal and Alan D. Sokal, "Class E-A New Class of High Efficiency Tuned Single-Ended Switching Power Amplifiers", *IEEE Journal of Solid-State Circuits*, vol. SC-10, No. 3, Jun. 1975, pp. 168–176.

Andrew F. Goldberg and John G. Kassakian, "The Application of Power MOSFETS at 10 MHz", *PESC 1985 Proceedings of the 16th Annual IEEE Power Electronics Specialists Conference*, Toulouse, France, Jun. 24–28, 1985, pp. 91–100.

Ronald J. Gutmann, "Application of RF Circuit Design Principles Distributed to Power Converters", *IEEE Transactions on Industrial Electronics and Control Instrumentation*, vol. IECI-27, No. 3, Aug. 1980.

Kwang-Hwa Liu, Fred C. Lee, "Resonant Switches—A Unified Approach to Improve Performances of Switching Converters", 1984 *IEEE International Telecommunications Energy Conference Proceedings*, New Orleans, LA, pp. 334–341.

*Primary Examiner*—Patrick R. Salce
*Assistant Examiner*—Anita M. Ault
*Attorney, Agent, or Firm*—Hamilton, Brook, Smith & Reynolds

[57] ABSTRACT

A resonant forward converter at a switching frequency of 10 MHz provides a small volume point-of-load converter for distributed power systems. The leakage inductance of a transformer is made negligibly small relative to the magnetizing inductance of the transformer. This enables a resonant controllable switch on the primary side of a transformer and a secondary side rectified diode to be switched either on or off at the same time. The capacitance across the primary side switch and the secondary side diode rings with a resonant inductor connected in parallel with the transformer. Both the switch and diode, therefore, have zero voltage switching transitions. Further, the resonant inductor being connected in parallel with the transformer provides a resonant ring that is independent of load.

63 Claims, 16 Drawing Sheets

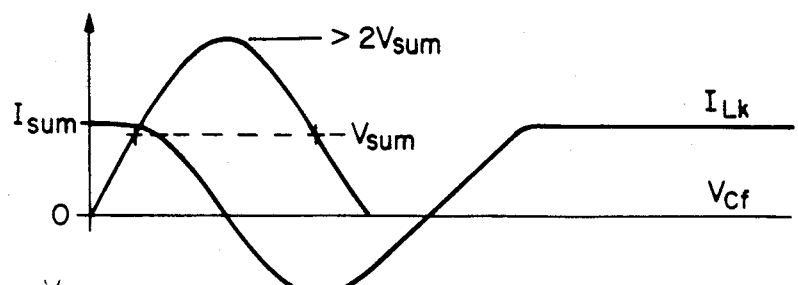
*Fig. 2a* PRIOR ART
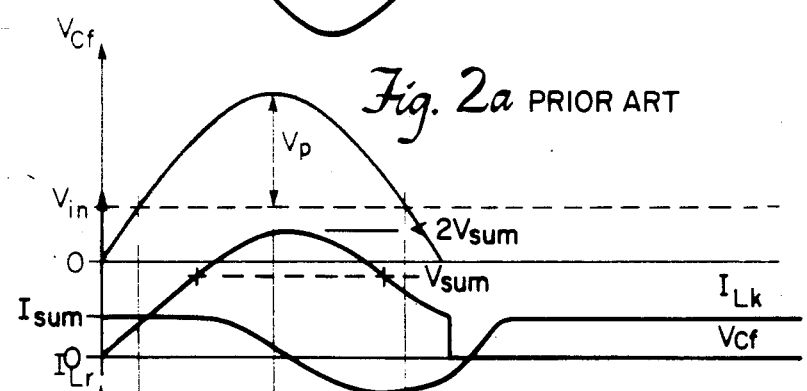
*Fig. 2b* PRIOR ART
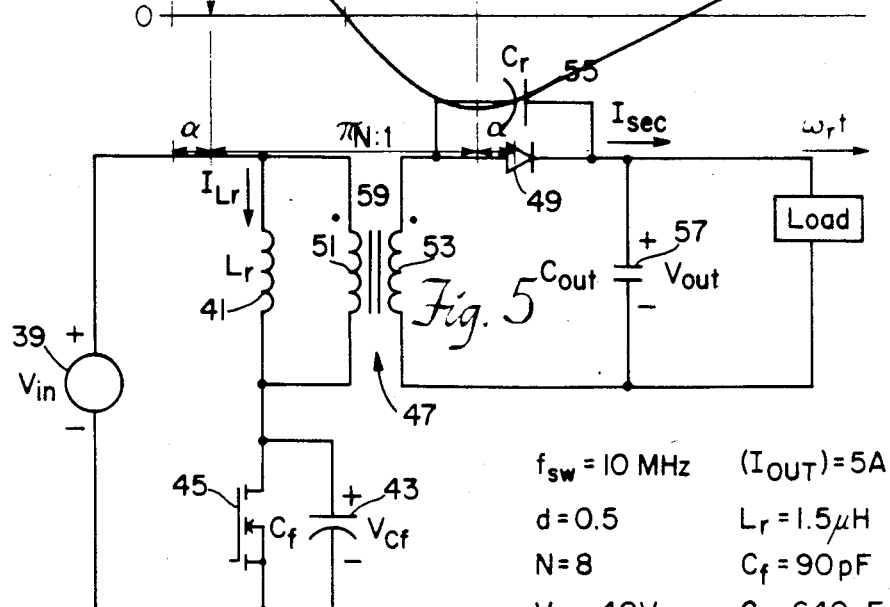
*Fig. 5*
*Fig. 4*
$f_{sw} = 10$ MHz    $(I_{OUT}) = 5$A
$d = 0.5$    $L_r = 1.5 \mu H$
$N = 8$    $C_f = 90$ pF
$V_{IN} = 40$V    $C_r = 640$ pF
$V_{OUT} = 5$V

RESONANT FORWARD CONVERTER

BACKGROUND OF THE INVENTION

Many state of the art computers and other electronic products of today employ numerous printed circuit boards. Load current from a current supply is delivered to the printed circuit boards through complex and costly buswork. In order to reduce this buswork, it is desired to mount power converting circuits on the individual circuit boards so that the power can be distributed at a higher voltage (e.g. 42 volts) and then converted at the point of load on each board to the logic level voltage of about 5 volts. However, since each board has such limited area and tight spacing, these point-of-load converters should have a power handling density of at least 50 watts/in$^3$ in order to make such a distributive power system viable.

However, the largest density typical of today's power electronic technology is about 5 watts/in$^3$. In order to achieve the desired improvement in this density, the switching frequency of power circuits has been significantly increased above the common 100 kHz range. This increase reduces the size of the transformers and filter elements that currently occupy a large portion of the circuits overall volume. Recent commercial efforts in the 1 MHz range have shown the potential for this approach, but their densities (around 15 watts/in$^3$) are still too low. Thus, an increase in switching frequency to the 5-10 MHz range is necessary for the desired distributed power system.

The switching of a power circuit in the 10 MHz range is disclosed by:

Nathan O. Sokal and Alan O. Sokal "Class E-A New Class of High Efficiency Tuned Single-ended Switching Power Amplifiers", *IEEE Journal of Solid-State Circuits*, Vol. sc-10, No. 3, June 1975;

Ronald J. Gutmann, "Application of RF Circuit Design Principles to Distribute Power Converters", *IEEE Transactions on Industrial Electronics and Control Instrumentation*, Vol. IECI -27, No. 3, August 1980; and Andrew F. Goldberg and John G. Kassakian, "The Application of Power MOSFET's at 10 MHz," PESC '85—Proceedings of the 16th Annual IEEE Power Electronics Specialists Conference, Toulouse, France, June 24-28, 1985, pages 91-100.

The disclosed devices and techniques make it evident that a feature known as resonant switching is necessary in order to achieve such a high switching frequency. A "resonant switch" is generally a subcircuit having a semiconductor controllable switch (i.e. a MOSFET) connected in series with an inductor and a capacitor connected in parallel with either the semiconductor switch or the combined series connection of the inductor and the semiconductor switch. The inductor and capacitor constitute a resonant LC circuit whose oscillation is initiated by either the turn-off or turn-on transition of the switch, and whose resonance is used to shape either the voltage or the current waveform of the switch.

Another disclosed feature of the topology of a 10 MHz converter is that the topology must not call for a step change in the voltage across a semiconductor device (i.e., the MOSFET switch). That is, even though the MOSFET is a majority carrier device, the energy stored in its junction capacitance is too great to lose every cycle at a 10 MHz rate.

One topology that seems to encompass the foregoing features is the "zero-voltage quasi-resonant converter" disclosed by K. Liu, F. C. Lee in "Zero Voltage Switching Technique in DC/DC Converters", IEEE PESC 1986 Record, pages 58-70;

K. Liu, F. C. Lee, "Resonant Switches-A Unified Approach to Improved Performance of Switching Converters", 1984 IEEE International Telecommunications Energy Conference Proceedings, pages 334-341;

K. Liu, R. Oruganti, F. C. Lee, "Resonant Switches-Topologies and Characteristics", IEEE PESC 1985 Record, pages 106-116.

These converters can be thought of either as a modification of a square wave topology or as half of a "classical" resonant converter (with a rectified load) operated in a discontinuous mode. These converters place a resonant capacitor in parallel with the controllable switch so that its voltage will rise slowly from zero at the turn-off transition and ring sinusoidally back to zero in time for the turn-on transition. This position of the capacitor is consistent with the switches own parasitic capacitance, and at a high enough frequency a separate element is not needed. By rearranging the relative positions of the switches, the resonant elements, and the input/output filter elements, topological forms that correspond to each of the various dc-dc converters can be generated.

A first problem with the zero voltage quasi resonant converter is its dependence on load. Under light load, the resonant ring of voltage across the controlled switch does not have sufficient amplitude to return to zero before the switch is again turned on. The energy that remains in the resonant capacitor at this instance in the cycle will therefore be lost. To avoid this dissipation, the characteristic impedance of the circuit could be made larger, but doing so would increase both the energy storage requirements of the resonant elements and the voltage to which the controlled switch is stressed at high load.

A second problem with this converter is that only the controlled switch has zero voltage transitions. The output or rectifying diode on the secondary side of a transformer does not. There are therefore losses associated with the rectifier's junction capacitance at both the turn-on and turn-off transitions. The importance of these losses depends on the relative size of this capacitance compared to that in parallel with the MOSFET (the resonant controllable switch). Since the initial purpose of a power converter discussed above requires a stepdown transformer, the turns ratio helps to make the size comparison between the capacitance and the MOSFET favorable, but the need to provide a large area diode, or even a sychronous rectifier, for low conduction loss makes this comparison unfavorable.

SUMMARY OF THE INVENTION

The present invention provides a resonant power circuit topology that avoids the inherent problems of the prior art. It is a topology that corresponds to a dc-dc forward converter, in which both the primary side resonant controllable switch and the secondary side rectifier diode are either on or off at the same time. The resonant inductor of the present invention is placed in parallel, rather than in series, with the transformer, so that the nature of the ring is independent of the load. The inductor may be naturally supplied by the magnetizing inductance of the transformer. In addition, the leakage inductance of the transformer is made negligibly small relative to the magnetizing inductance of the transformer, such that the controllable switch and the output diode are placed in parallel throughout the resonant ring. Both can therefore be given "zero voltage" switch transitions.

In one embodiment of the present invention, a transformer has a primary and secondary winding wound about a core element with matching polarity. Connected in series with the primary winding of the transformer is a controllable switch. In a preferred embodiment the controllable switch is a MOSFET. Connected in parallel with the controllable switch is a capacitor. And connected in parallel with the primary winding of the transformer is the resonant inductor. A first series circuit is then defined by the input dc voltage source, the primary of the transformer in parallel with the resonant inductor and the controllable switch in parallel with its capacitor. The controllable switch is turned on and off at a rapid rate to provide current flow through this first series circuit.

A second series circuit is defined by the secondary winding of the transformer in series with a unilateral conducting element and the load. The unilateral conducting element has a capacitor coupled in parallel with it. In a preferred embodiment the unilateral conducting element is a diode. The controllable switch and the diode connected as described turn on and off at the same time during the switching cycle. The resonant inductor being connected in parallel with the primary winding of the transformer does not carry load current but is naturally supplied with a current from the input voltage source. Thus, the nature of the ring of the converter is independent of the load.

In accordance with another aspect of the present invention, a leakage inductor may be connected in series with the secondary winding and the unilateral conducting element. (The leakage inductor and the resonant inductor can be on either side of the transformer). It is desirable to limit the size of this leakage inductance to a negligibly small value compared to the resonant inductor such that the unilateral conducting element and controllable switch both have zero voltage switching transitions.

In accordance with another aspect of the present invention, a circuit to reverse the non-linearity junction capacitance of the converter may be added. This circuit would include a unilateral conducting element in series with a capacitor. The unilateral conducting element and the capacitor are placed in parallel with the controllable switch. The capacitor has a voltage greater than the peak voltage of the controllable switch such that the voltage across the unilateral conducting element decreases with increasing voltage across the controllable switch. The junction capacitance of the unilateral conducting element, therefore, increases as the voltage across the controllable switch increases. When the voltage of the capacitor is less than that across the controllable switch, the unilateral conducting element provides current to the capacitor and charges the capacitor above the peak voltage of the controllable switch. Hence, the voltage across the capacitor is self-regulating through the unilateral conducting element. In a preferred embodiment, the unilateral conducting element is a diode.

In another embodiment of the invention, a dual resonant forward converter comprises two of the above described converters coupled in parallel with the voltage source and coupled in parallel with the load. Thus, there are two transformers each having a primary and secondary winding wound about respective core elements. There are two controllable switches; one is connected in series with one transformer and having a capacitor connected in parallel with it. The second controllable switch is connected in series with the second transformer and has a capacitor connected in parallel with it. There are also two resonant inductors. One is connected in parallel with one transformer and the other is connected in parallel with the second transformer. The first controllable switch is turned on and off at a rapid rate to provide current through the primary winding of the first transformer from the voltage source. The second controllable switch is turned on and off at a rapid rate to provide current through the primary winding of the second transformer from the voltage source. The secondary windings of each transformer are connected in series with respective unilateral conducting elements, and then both are connected in parallel to a common node and the load. The two converters are operated such that when one is delivering power to the load, the other is undergoing its resonant ring. This approach could be extended to three or more converters.

In one aspect of the dual forward embodiment, a pre-regulation circuit may be connected to the primary side series circuits to provide a regulated output voltage.

In another aspect of the dual forward embodiment, the voltage output may be converted to a current output by placing a series inductor between the common node and the load.

Further, the secondary side unilateral conducting elements may be replaced, or placed in parallel, with controllable switches to reduce conduction losses. The switches are conventionally known as synchronous rectifiers. In a preferred embodiment, the controllable switches are MOSFET's.

BRIEF DESCRIPTION OF THE DRAWINGS

The foregoing and other objects, features and advantages of the invention will be apparent from the more particular description of preferred embodiments of the invention, as illustrated in the accompanying drawings in which like referenced characters refer to the same parts throughout the different views. The drawings are not necessarily to scale, emphasis instead being placed upon illustrating the principles of the invention.

FIG. 1b is an illustration of the waveforms of the flyback converter of FIG. 1a.

FIGS. 2a and b are illustrations of the effects of high and low load current respectively on the waveforms of MOSFET's in prior art converters.

FIGS. 3b and c are illustrations of the effect of output rectifier capacitance on the waveforms of the converter of FIGS. 3a and 1a.

FIG. 4 is a schematic of an electric circuit for a single ended resonant forward converter embodying the present invention.

FIG. 13b is an illustration of the waveforms of the circuit of FIG. 13a.

FIG. 15b is an illustration of the waveforms the circuits of FIGS. 14 and 15a.

DETAILED DESCRIPTION OF THE PREFERRED EMBODIMENTS

Figure 1A:
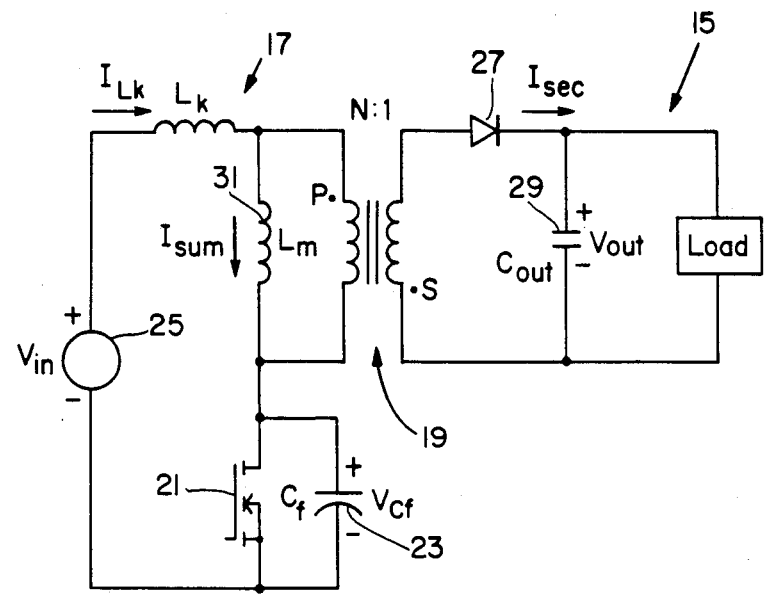
FIG. 1a is a schematic of an electrical circuit of a zero-voltage quasi resonant flyback converter of prior art.

In order to fully appreciate the present invention, a more detailed description of the switching losses that can occur in a zero voltage quasi-resonant converter precedes the discussion of the preferred embodiments. The switching losses that can occur are examplified by a zero-voltage quasi-resonant flyback converter 15 shown in FIG. 1a. The Converter 15 employs a leakage inductor 17 connected in series with the primary winding of an 8:1 step down transformer 19, a MOSFET 21 and the voltage source 25. Inductor 17 may be connected on the secondary winding side of transformer 19. The transformer 19 has opposite polarity primary and secondary windings indicated by the dots at the appropriate ends of the windings. An inductor 31 that represents the transformer's magnetizing inductance is shown connected in parallel with the primary winding P of the transformer 19. A capacitor 23 is placed in parallel with the MOSFET 21. An output rectifier 27 is connected in series with the secondary winding S and the large output filter capacitor 29 in prallel with the load. The illustrated flyback converter 15 is a 25 watt converter which when operated at an effective 50% duty cycle at 10 MHz provides a 5 amp load current (at a 5 volt output) from a 50 volt supply. Leakage inductance $L_k$ equals 700 mH, and capacitance $C_f$ of capacitor 29 equals 110 pF.

Figure 1B:
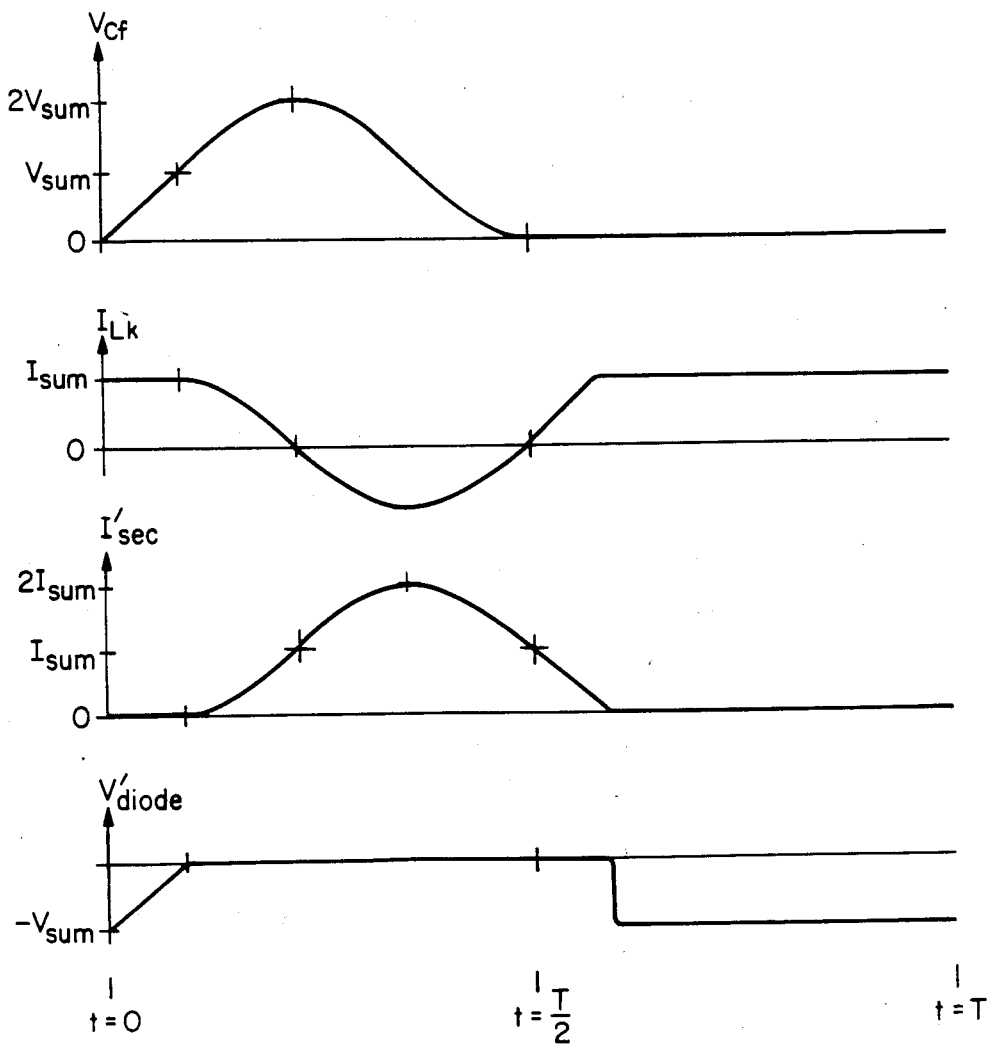

FIG. 1b shows the waveforms one would expect if rectifier 27 were to have zero capacitance and the load current were to be at its optimal value. When MOSFET 21 is turned off at t=0, the MOSFET no longer actively pulls energy from voltage source 25. The existing current in the circuit is drawn through leakage inductor 17 and magnetizing inductor 31 to capacitor 23. The voltage across capacitor 23, $V_{Cf}$, rises linearly from 0 to $V_{sum}$ (which equals $V_{in}+NV_{out}$) as capacitor 23 is charged by the current $I_{sum}=(I_{Lk}+I_{sec}/N)$. The current flow through magnetizing inductor 31 by charging capacitor 23, changes polarity of the voltage across the primary winding of transformer 19 which changes polarity of the voltage across the secondary winding. The change in polarity causes the voltage across the rectifier 27 to change from a negative value to zero. The rectifier 27 then turns on, the transformer voltage on the secondary side is clamped at about minus $V_{out}$, and a resonant ring between capacitance $C_f$ of capacitor 23 and leakage inductance $L_k$ of leakage inductor 17 commences. Voltage $V_{Cf}$ across MOSFET 21 increases to about $2V_{sum}$ and current $I_{Lk}$ in leakage inductor 17 drops from $I_{sum}$ to zero. Rectifier 27 remains on, passing a current up to $2 I_{sum}$ at which point current $I_{Lk}$ in leakage inductor 17 drops below zero and voltage $V_{cf}$ decreases from $2V_{sum}$. One half of a cycle later, the voltage $V_{cf}$ across MOSFET 21 just reaches zero, and the MOSFET is turned on. The current $I_{Lk}$ in leakage inductor 17 then rises linearly from zero to $I_{sum}$, at which point the current $I_{sec}$ flowing through the rectifier 27 reaches zero and the rectifier turns off.

The waveforms of FIG. 1b assume that the ratio ($V_{sum}/I_{sum}$) is equal to the characteristic impedance $\sqrt{L_k/C_f}$. In such a case, the amplitude of the sinusoidal ring in the MOSFET's voltage is exactly equal to its offset $V_{sum}$, and there is an instant in the cycle in which the MOSFET can be turned on with zero volts across it.

A smaller ($V_{sum}/I_{sum}$) is also satisfactory, as the waveforms in FIG. 2a show. In this high-load case, the amplitude of the sinusoidal component in $V_{Cf}$ is greater than its offset, and voltage across The MOSFET will try to ring negative. The anti-parallel diode of the MOSFET will instead clamp this voltage at zero until the current $I_{Lk}$ in the leakage inductor returns to a positive value. At any time during this clamp interval, the MOSFET can be turned on without loss.

If the ratio ($V_{sum}/I_{sum}$) is too large compared to the characteristic impedance, however, the voltage across the MOSFET will not return to zero. In this low load situation, depicted in FIG. 2b, the MOSFET dissipates the energy that remains in parallel capacitor 23 when the turn-on transition occurs. This dissipation can be significant. For example, if the characteristic impedance is chosen to match the highest load current (say 50% greater than the rated current), and the circuit is then operated at half load the sinusoidal ring will have only one-third the required amplitude. With $V_{sum}$ equal to 100 volts, the MOSFET will therefore have 67 volts across it at the turn-on transition. Given a parallel capacitance of 110 pF for parallel capacitor 23, 2.5 watts (ten percent of full power, twenty percent of half-power) will be lost.

To avoid this loss, the characteristic impedance of the resonant element (i.e. the parallel capacitor) could be reduced by a factor of three so that the optimal waveforms of FIG. 1b would occur at half load. However, doing so would increase the peak voltage across the MOSFET at maximum load from two times $V_{sum}$ to four times $V_{sum}$. For the example of FIG. 1a, this translates into a voltage of approximately 8 $V_{in}$ which is most undesirable.

Figure 3A:
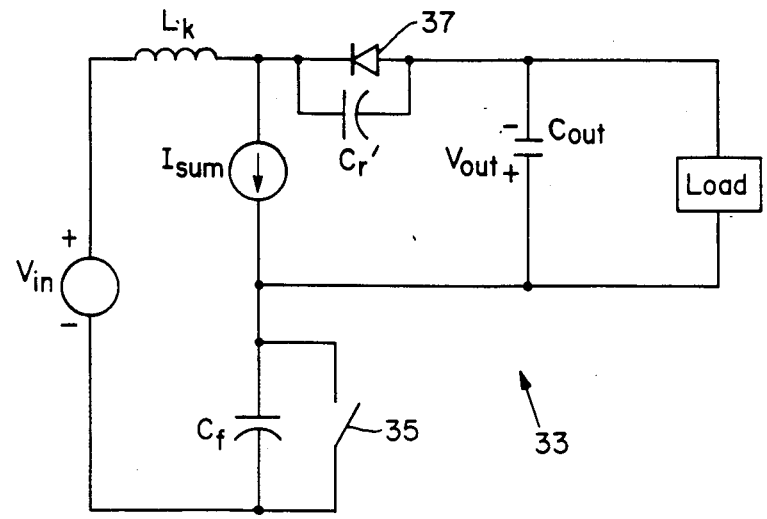
FIG. 3a is a schematic of an equivalent electrical circuit of the converter of FIG. 1a with all values reflected to the primary side of the transformer.
Figure 3B:
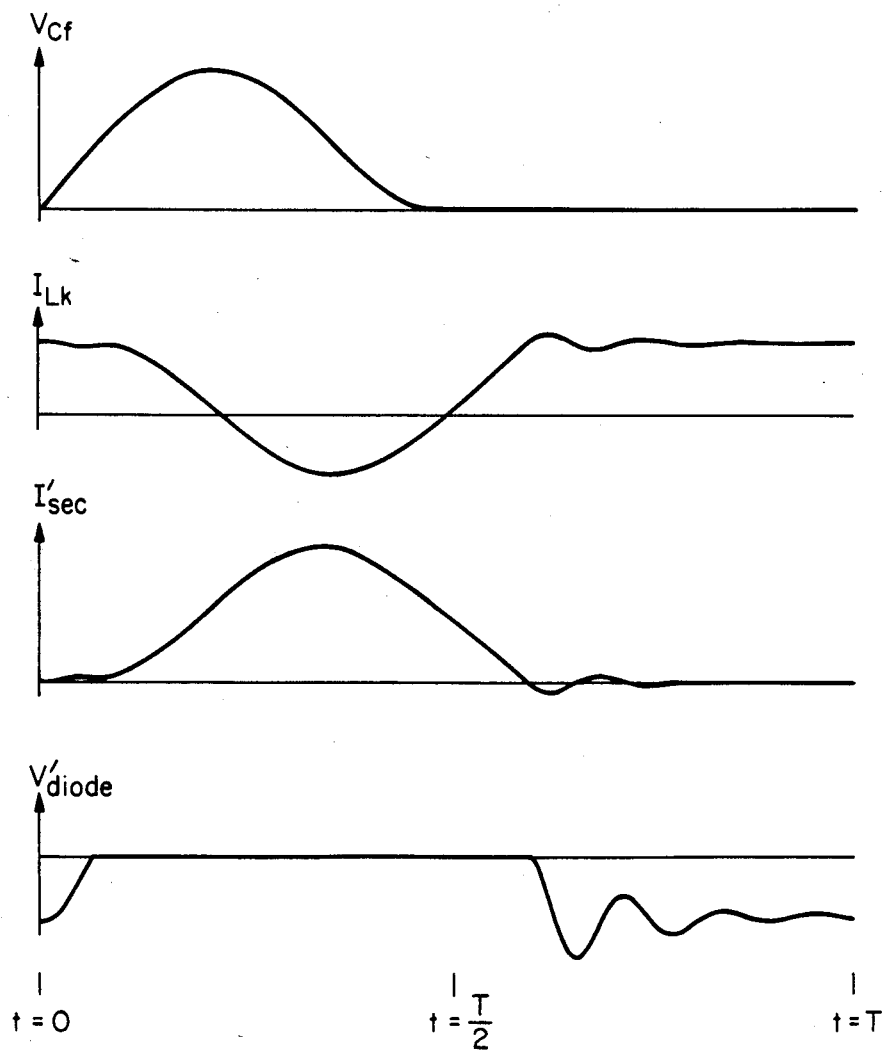

If we now assume the output rectifier has a finite capacitance $C_r'$ (reflected to the primary winding) that is small compared to $C_f$, there will be additional high frequency oscillations (based on $1/\sqrt{L_k C_r'}$) superimposed on the waveforms of FIG. 1b as shown in FIG. 3b. An equivalent circuit 33 where all values are reflected to the primary side is provided in FIG. 3a. This circuit 33 has a voltage supply, $V_{in}$, connected in series with a leakage inductor $L_k$ and a switch 35. A reverse biased diode 37 and its parallel capacitor $C_r'$ define a rectifier and are connected in parallel to the circuit between the inductor $L_k$ and switch 35. A capacitor $C_f$ is connected in parallel with switch 35. Connected in series with the rectifer is a large output capacitor and the load.

The additional high frequency oscillation that causes the most problems occurs when the rectifier turns off. Rather than taking a step change to $V_{sum}$, the voltage across $C_r'$ will instead ring with an amplitude of $V_{sum}$ around its nominal offstate value as shown by the waveform for $V_{diode}$ just after time t=T/2 in FIG. 3b. Unless this ring is severely dampened, the rectifier and the transformer windings will have to be rated for twice the expected voltage stress. Even with moderate damping, the oscillations will eventually decay to zero, and the energy lost will equal $E_{turn-on} = \frac{1}{2} C_r' V^2_{sum}$.

The oscillation that occurs when the MOSFET switch is turned off can be explained by describing the transient as the sum of two parts. The first is simply the linear charging of parallel capacitor switch capacitor $C_r'$ and $C_f$ by the current $I_{sum}$. The ratio of these capacitors dictates how the current will split between the two. The full current starts by flowing only through $C_f$, because this is the initial value of the current in leakage inductor $L_k$. An oscillation therefore occurs between $L_k$ and the series combination of the two capacitors $C_r$ and $C_f$ as shown in FIG. 3b after t=0. The initial conditions of this incremental oscillation are zero volts across each capacitor and a current $I_0$ in the leakage inductor $L_k$, where $$I_0 = I_{sum}\left(1 - \frac{C_f}{C_f + C_r'}\right) = I_{sum}\left(\frac{C_r'}{C_f + C_r'}\right)$$

When this oscillation decays to zero, an energy equal to $$E_{turn-off} = \frac{1}{2} L_k I_0^2 \cong \frac{1}{2} C_r V^2_{sum}\left(\frac{C_r'}{C_f}\right)$$

will have been lost. In general, this energy is small compared to that which is lost when the rectifier turns off.

If the rectifier is a Schottky diode with a typical capacitance of 320 pF ($C_r'$=5 pF), these oscillations occur but represent very little If, on the other hand, a synchronous rectifier is used, the losses can be significant. Given a typical capacitance of 1300 pF ($C_r'$=20 pF), for a 30 mΩ, 50V MOSFET. The energy loss at 10 MHz will be approximately 1.25 watts or 5% of the power level. This additional dissipation is approximately equal to the reduction in conduction losses that the sychronous rectifier was supposed to supply. Furhermore, it is a loss that is independent of load power.

Figure 3C:
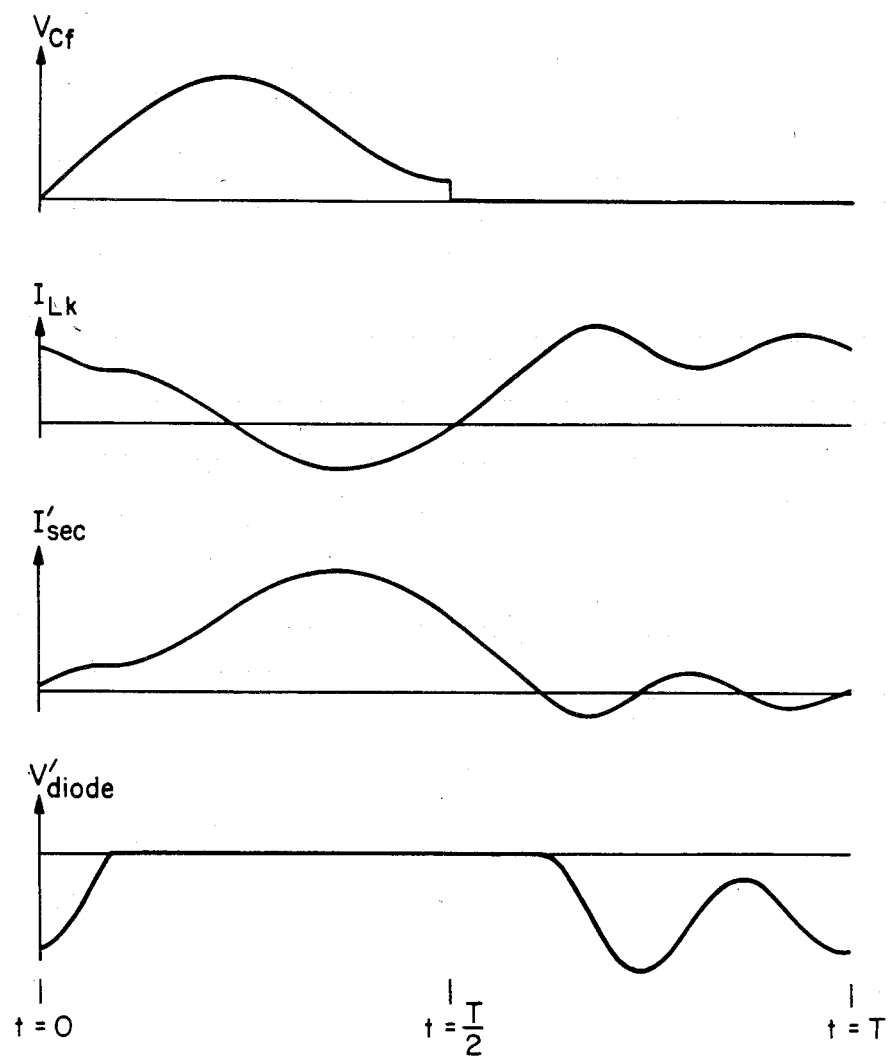

Actually, it is possible that the oscillations caused by the rectifier capacitance will not decay to zero before the next switch transition. This is particularly true when $C_r'$ is large and the oscillation frequency is only a few times higher than the fundamental resonant frequency. While it may seem that such a situation is desirable because the dissipation is avoided, many other complications occur. As the waveforms in FIG. 3c shows, the oscillations disturb the entire operation of the circuit, and may often cause the MOSFET to have a substantial voltage across it at turn-on (i.e. at t=T/2). In addition, the circuit's conversion ratio is very sensitive to load current and duty cycle. In general, it does not appear that the circuit can be operated in this manner without sophisticated control.

Damping could be provided to control the oscillation as was done in the prior art device disclosed by K. Liu and F. C. Lee, where a series RC network was placed in parallel to the rectifier. However, this approach dissipates more energy than discussed above because the additional capacitor must also be charged and discharged. It is therefore a solution that is only viable when the rectifier capacitance is very small and the additional dissipation can be afforded.

The most basic form of a converter embodying the present invention is shown in FIG. 4. A single ended resonant forward converter having an input voltage source 39, $V_{in}$, connected in series with a transformer 47 with a controllable switch 45 is modified by the addition of a resonant inductor 41, $L_r$, and capacitors 55 and 43 ($C_r$ and $C_f$) respectively. transformer 47 has a primary and secondary winding, 51 and 53 respectively, wound about a magnetic core 59 with matching polarities as indicated by the dots at the same end of the primary and secondary windings. Resonant inductor 41, $L_r$, is placed in parallel with the primary winding 51 of transformer 47, and capacitor 43, $C_f$, is connected in parallel with controllable switch 45 which is preferrably a MOSFET. Resonant inductor 41 may be placed in parallel with secondary winding 53. Capacitor 55, $C_r$, is placed in parallel with a diode or output rectifier 49 which is in series with the secondary winding 53 of transformer 47 and a large output capacitor 57 in parallel with the load. Resonant inductor 41, $L_r$, is naturally supplied by the inductance of transformer 47. Capacitor 43, $C_f$, can be at least partially implemented with the junction capacitance of the MOSFET 45 and the rectifier 49, as well as the winding capacitance of the transformer 47.

Figure 5:
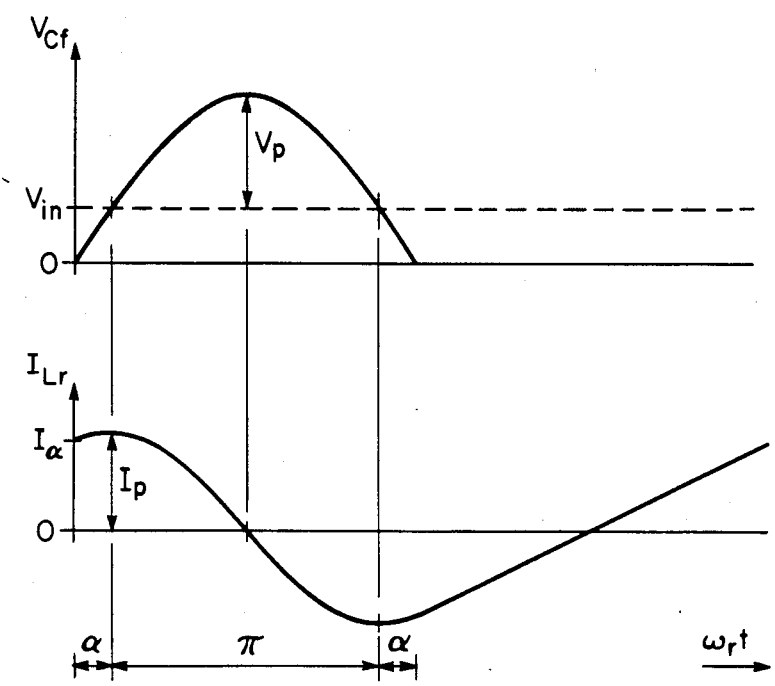
FIG. 5 is an illustration of the waveforms of the embodiment of FIG. 4.

The waveforms of FIG. 5 show the operation of the circuit of FIG. 4. When MOSFET or controllable switch 45 is on, the circuit behaves as a typical forward converter in which the current flowing toward the load through forward biased rectifier 49 is roughly constant and the current $I_{Lr}$ through resonant inductor 41, $L_r$, is linearly increasing. When the MOSFET switch 45 is turned off, for example at t=0, its current commutates to the resonant capacitor 43, $C_f$, and charges the capacitor. Capacitor voltage $V_{Cf}$ begins to rise. Meanwhile, the load current existing in secondary winding 53 drops to zero as the diode or the output rectifier 49 becomes reversed biased. The resonant inductor 41, $L_r$, and both capacitors $C_r$, $C_f$ (55 and 43 respectively) then ring sinusoidally through nearly a full cycle until voltage $V_{Cf}$ of the resonant capacitor 43 returns to zero and the inductor current $I_{Lr}$ is at a peak negative value.

From this point, the capacitor voltage $V_{Cf}$ would normally continue to ring negative, but it is instead clamped at zero by the forward biased output rectifier 49 and the internal body diode of the MOSFET 45. Finally, to begin the new cycle, the MOSFET is turned on before the inductor current $I_{Lr}$ changes polarity and begins to charge capacitor 43, $C_f$, to a positive voltage.

Thus, besides the zero-voltage switching of both semiconductor devices (MOSFET 45 and rectifier diode 49), the topology of the present invention combines the resetting of the transformer 47 with the resonant ring. This topology also offers a magnetizing flux swing that is centered around zero, rather than one that reaches zero only at its minimum point. A savings of two on the peak flux level is therefore achieved.

Because the resonant inductor 41, $L_r$, in this topology does not carry the load current, the details of the resonant ring depend only on the input voltage and the resonant component values. The voltage across MOSFET 45 therefore always returns to zero, no matter what the load. Moreover, the peak voltage of MOSFET 45, which is also independent of load, is a function of only the input voltage and the duty cycle. That is, since the resonant ring begins with the resonant inductor 41, $L_r$, already carrying a current $I_\alpha$, as shown in FIG. 5, the amplitude of the sinusoidal voltage $V_p$ of capacitor 43, $C_f$ is greater than that of the dc offset voltage $V_{in}$ of capacitor 43. The angle $\alpha$ is the angle between the start of the ring and the point where the capacitor voltage $V_{Cf}$ is equal to $V_{in}$. Sinusoidal voltage $V_p$ and voltage $V_{in}$ are related by the equations $$V_{in}/V_p = \sin \alpha$$

and $$I_{60}/I_p = \cos \alpha$$

where $I_p$ is the amplitude of the sinusoidal current waveform of resonant inductor 41, $L_r$. The duration of the ring is $$(\pi + 2\alpha)\sqrt{L_r C_{tot}} = (1 - D)/f$$

where D is duty cycle, f is switching frequency of MOSFET 45, and total capacitance $C_{tot} = C_f + C_r$ because capacitors $C_f$ and $C_r$ are incrementally parallel. The value of $I_\alpha$, the current flowing in resonant inductor 41 when the sinusoidal ring begins, is $$I_\alpha = \frac{V_{in} D}{2L_r f}$$

Combining these foregoing relationships gives $$\tan\alpha = \frac{\sin\alpha}{\cos\alpha} = \frac{V_{in} I_p}{V_p I_\alpha} = \frac{2(1 - D)/D}{\pi + 2\alpha}$$

From this transcendental equation the peak voltage across MOSFET 45, which is equal to ($V_{in} + V_p$), can be found. Thus, for a duty cycle of 50% ($\alpha = 26°$), the peak voltage across the MOSFET is equal to $3.28 V_{in}$. This value compares quite favorably with the peak voltage of $4V_{in}$ that the MOSFET sees in an optimally designed quasi resonant flyback converter with a duty cycle of 50%. The comparison is even more favorable when one remembers that the quasi resonant converter's dependence on load current could result in a peak voltage as high as $8V_{in}$, as discussed previously.

The peak voltage in the forward resonant converter of the present invention is also independent of the component values. The designer is therefore free to adjust the peak resonant current and the characteristic impedance without affecting the MOSFET voltage rating.

Figure 6:
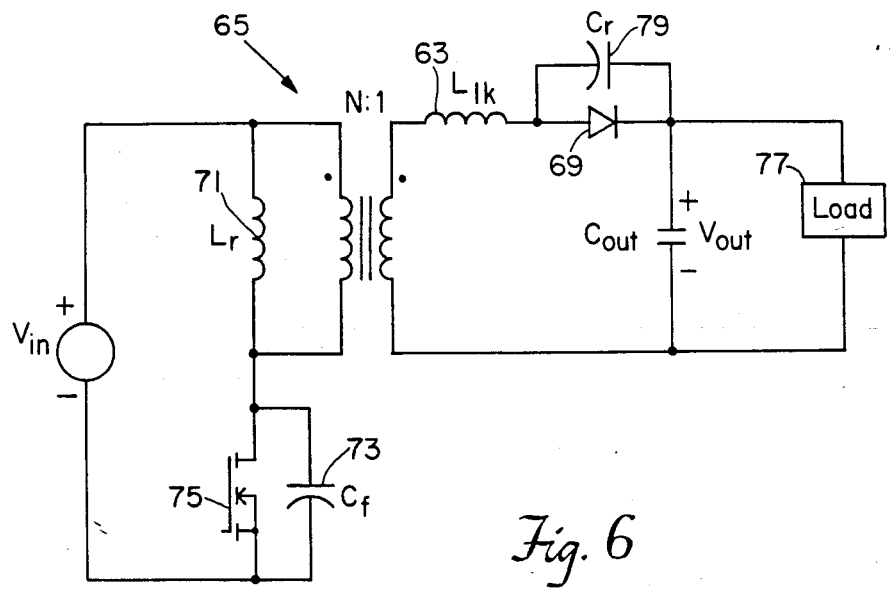
FIG. 6 is a schematic of an electrical circuit of another embodiment of the invention.

In an actual circuit, the transformer will have a finite leakage inductance, particularly on the low voltage side where the parasitic inductance of the connection wires is so much more significant. If this leakage inductance $L_{lk}$ is only a few percent of the magnetizing inductance $L_r$, then it is best represented as a secondary side element 63 in the circuit 65 as shown in FIG. 6. Leakage inductor $L_{lk}$ may however be represented as a primary side element and have the same effect. The rest of circuit 65 in FIG. 6 is the same as the circuit of FIG. 4. The operation of the circuit is modified in the manner illustrated by the waveforms in FIG. 7.

When MOSFET 75 is turned on, the current flowing toward the load 77 will no longer make a step change to its final value. It will instead rise exponentially with a time constant that is typically short compared to the overall period. This slow rise helps to make the MOSFET's turn-on transition even more benign that it already is, but it does give a slight load regulation to the output voltage.

Figure 7:
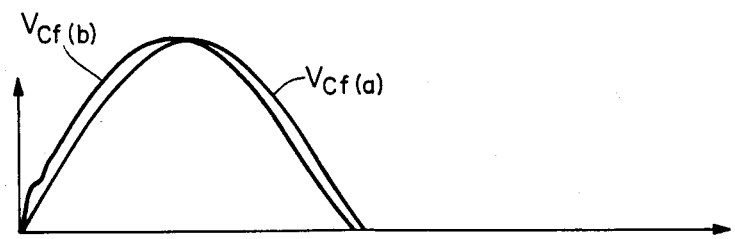
FIG. 7 is an illustration of the waveforms of the embodiment of FIG. 6 compared to that of the embodiment of FIG. 4.
Figure 7:
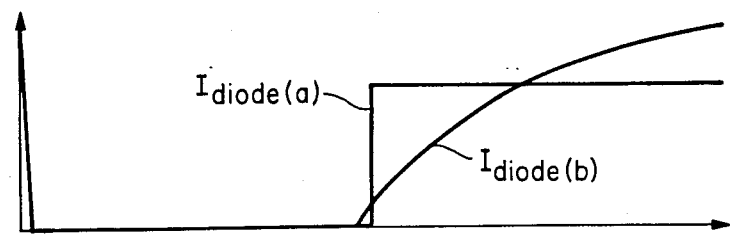
Figure 7:
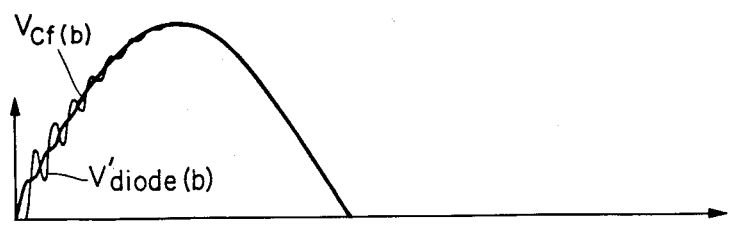

More important is the effect of the leakage inductanc $L_{lk}$ on the turn-off transition. When MOSFET 75 is turned off, the secondary winding current, instead of dropping immediately to zero, will now continue until enough volt-seconds have been placed across the leakage inductor 63. Two changes in the basic waveforms of FIG. 5 result. First, because the capacitor voltage $V_{Cf}$ momentarily carries both the resonant inductor's current and the load current, the capacitor voltage $V_{Cf}$ charges at a faster rate than in the circuit of FIG. 4. This faster rate places a greater switching stress on the MOSFET 75, and it also causes the voltage to return to zero slightly earlier, as the waveforms of FIG. 7 show, where the waveforms referenced "a" illustrates wave behavior with no leakage inductance and the waveforms referenced "b" illustrate wave behavior in which a 20 nH leakage inductance exists. The exact details of what happens depends on the relative size of the leakage and resonant inductors 63 and 71 respectively, as well as on the currents they are carrying when the turn-on transition starts. Given that the leakage inductance $L_{lk}$ is only one or two percent of the magnetizing inductance $L_r$, the effect is very small.

The second alteration to the waveforms is the presence of a high frequency ring when the output rectifier 69 finally turns off. By the time the current in the transformer secondary winding reaches zero and the rectifier diode 69 starts to turn off, the voltage across the parallel capacitor 73 of the MOSFET has risen to approximately $$V_a = (I_1 + I_\alpha)\sqrt{\frac{L_{lk}}{C_f}}$$

where $I_1$ is the reflected load current, $I_\alpha$ is the current flowing in resonant inductor 71 when the sinusoidal ring begins, and $C_f$ is the capacitance of capacitor 73.

An oscillation between the leakage inductance $L_{lk}$ and the series combination of, $C_f$ and $C_r$, of the parallel capacitor 73 and diode capacitor 79 respectively, driven by the difference in voltage between the capacitors, results. Due to the very small leakage inductance $L_{lk}$, this oscillation is at a very high frequency. The oscillation decays before the peak voltage across the capacitors is reached, as shown by the graph of $V_{cf(b)}$ and $V'_{diode(b)}$ of FIG. 7. By the time the oscillation has decayed to zero, the energy lost will equal $$\tfrac{1}{2} C_f V_a^2 \left( \frac{C_f}{C_f + C_r} \right) = \tfrac{1}{2} L_{lk}(I_1 + I_a)^2 \left( \frac{C_r}{C_f + C_r} \right)$$

If $I_l = 2I_a$, this loss is approximately equal to $L_{lk}/L_r$ times the average power flow, so a leakage inductance smaller than 1–3% of the magnetzing inductance $L_r$ is desired.

Figure 8A:
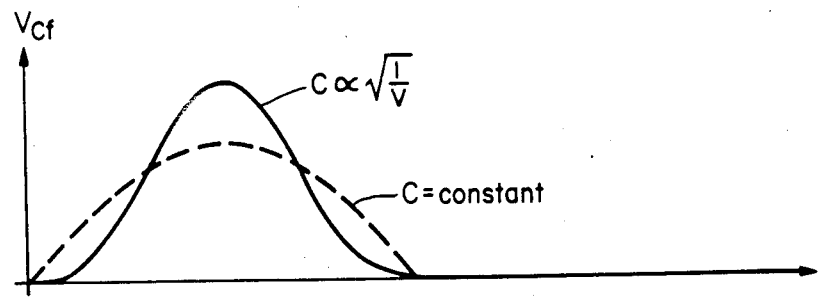
FIG. 8a is an illustration of the effect of nonlinear resonant capacitance on the waveform of the embodiment of FIG. 4.

Another deviation from the waveforms of FIG. 5 occurs in the waveforms of circuit 65 of FIG. 6 because MosFET 75 and output rectifier 69 have non-linear junction capacitors, 73 and 79 respectively. In a 10 MHz circuit, the value of the resonant capacitance is so small that these capacitors provide much, if not all, of what is needed. Unfortunately, the nonlinearity causes a higher peak voltage across the semiconductor devices (i.e. MOSFET 75 and diode 69) as shown in the waveform of FIG. 8a. Since capacitors 73 and 79 are large at low voltage, the resonant ring is slow during this portion of the cycle, and more time is spent below $V_{in}$ by capacitors 73 and 79 than by the linear capacitors 43 and 55 of the circuit in FIG. 4, as shown by the dotted line in FIG. 8a. Given that the ring finishes in the same time, the peak voltage, therefore, must be higher as can be seen by the solid line in FIG. 8a. An increase in the voltage peak of 33% is typical. It should be noted that this problem exists for the zero-voltage quasi-resonant converter of the prior part as well.

Figure 8B:
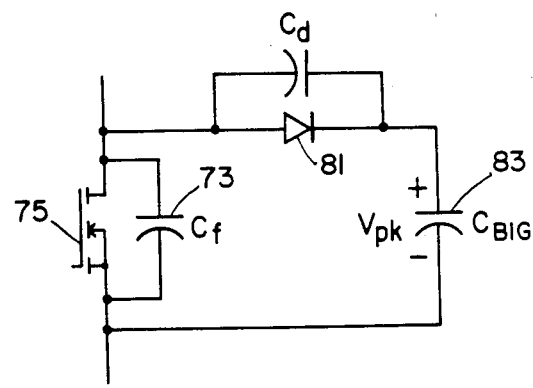
FIG. 8b is a schematic of an electric circuit to reverse the nonlinearity of the resonant capacitor in the circuit of FIG. 4.
Figure 8C:
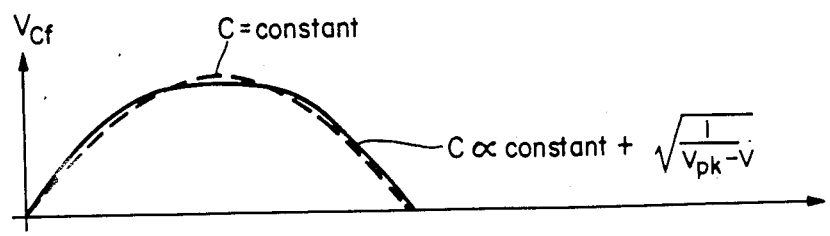
FIG. 8c is an illustration of the waveform of the embodiment of FIG. 4 with the added circuit of FIG. 8b.

If the junction capacitance across the MOSFET started small and then got big, the nonlinearity would actually help to reduce the peak semiconductor voltage. Such nonlinearity is achieved in the present invention by adding a diode 81 in series with a dc capacitor 83 to the circuit of FIG. 6 as shown in FIG. 8b. Other circuits known in the art for achieving such nonlinearity are also suitable. The circuit of FIG. 8b may similarly be connected to the circuit of FIG. 4. To understand how this circuitry works, assume that the dc capacitor 83 is charged to a voltage slightly higher than the peak MOSFET voltage. Diode 81 will therefore always be reversed-biased, and it will appear as a capacitor that gets bigger with increasing MOSFET voltage. The waveforms of FIG. 8c show the advantage of this arrangement where the solid line represents the waveform for the converter of FIG. 6 with the added circuitry of FIG. 8b.

Because diode 81 never turns on under steady-state conditions, the average current flowing into the dc capacitor 83 is zero, and the average energy delivered to it is therefore also zero. If the capacitor voltage is too low, however, diode 81 will become forward-biased and provide the net charge needed to raise the dc capacitor 83 to the correct value. The voltage across the dc capacitor 83 is therefore self-regulating. The value of this additional capacitor must be several times that of the diode's capacitance, but it is still quite small relative to the total capacitance of the circuit considering the benefits this scheme provides. Furthermore, it is a scheme that can be used by all zero-voltage resonant topologies.

It should be noted, however, that the change from an unfavorable to a favorable nonlinearity is only possible if the MOSFET and output rectifier have junction capacitances that are smaller than the total capacitance called for by the circuit. Otherwise, it is not possible to add capacitance and still maintain the ringing frequency. It is important, therefore, to minimize these junction capacitances.

Furthermore, at least second-order, and more likely third-order input and output filters are needed at each port in the circuits of FIGS. 4 and 6. Unfortunately, while a 10 MHz switching frequency makes these filter elements small, they are still large enough to dominate the power circuit's overall volume. This is particularly true at the output, where both the strict ripple specifications and the difficulty of getting a high capacitance density at low voltage result in a physically large output capacitor. The filter elements are large due to power being delivered through the transformer for only half of the cycle. This is a problem with all single-ended power circuits, and it is usually avoided by using a center-tapped transformer in a double-ended configuration. Power can then flow through the transformer throughout 100% of the cycle, and the filter elements can be made very small.

Figure 9:
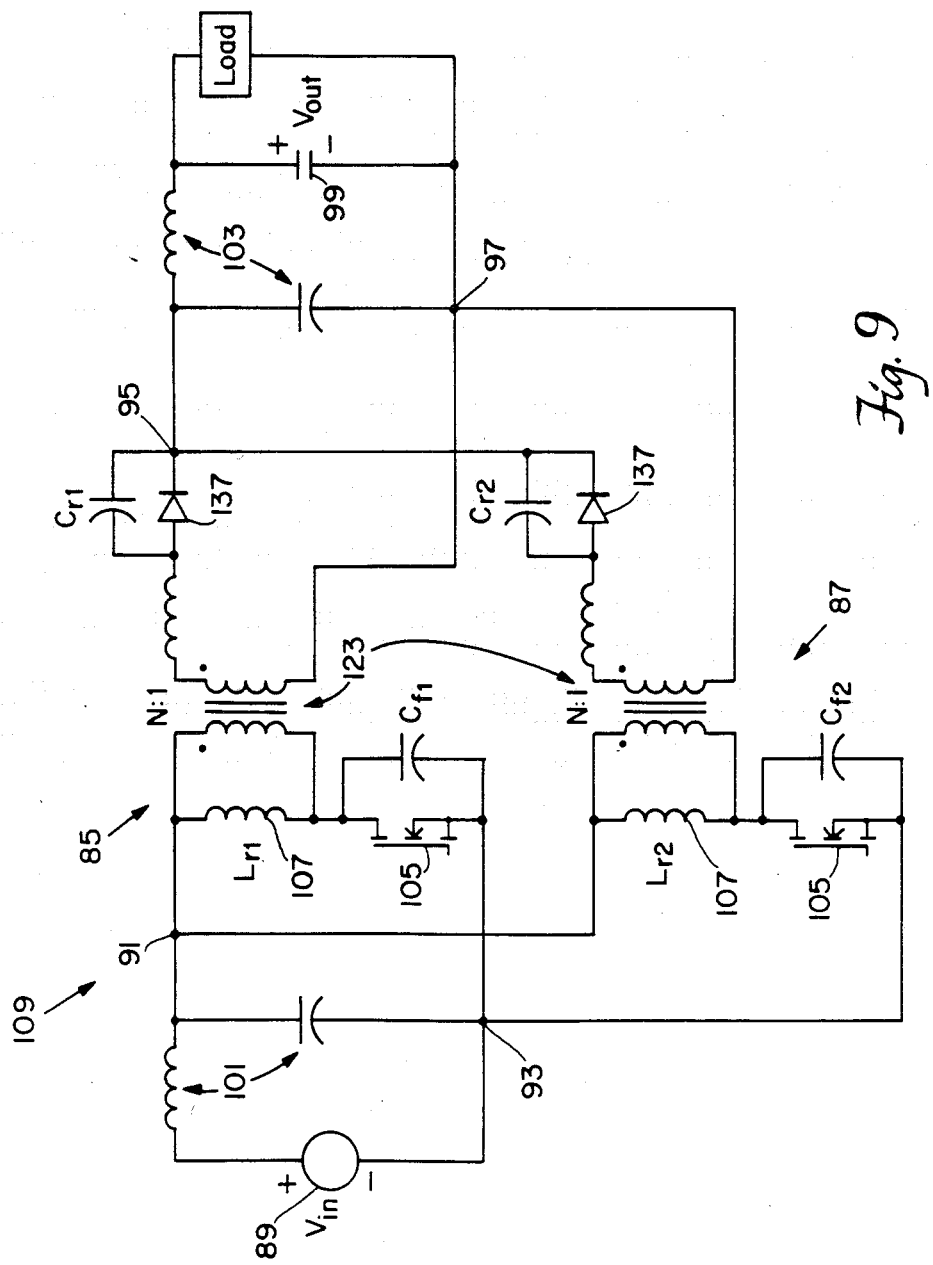
FIG. 9 is a schematic of an electrical circuit of a dual resonant forward converter embodying the present invention.

For the resonant forward-converter presented in FIG. 4, it is not possible to configure a double-ended circuit in which the transformer windings of each half are coupled. When one half of the circuit is off, the voltage across its transformer winding must be free to follow its resonant ring, rather than be constrained by the on-state operation of the other half. A double-ended version must therefore be the parallel combination of two single-ended forward converters of FIG. 6 operated 180 degrees out of phase, as shown in FIG. 9. The primary side of one single ended converter 85 is connected at nodes 91 and 93, in parallel with the primary side of a second single ended converter 87 to $V_{in}$ the voltage source 89. The respective secondary sides of converters 85 and 87 are similarly connected at nodes 95 and 97 to a parallel output capacitor 99, and the load. Input filter elements 101 are connected to voltage source 89 between nodes 91 and 93. Output filter elements 103 are connected to parallel output capacitor 99 and the load between nodes 95 and 97. The input and output filter elements 101 and 103 include a series inductor and a capacitor in parallel with the respective voltage source 89 or combined parallel output capacitor 99 and load.

Converters 85 and 87 operate such that one is delivering power to the load while the other is undergoing its resonant ring. This approach may be extended to three or more converters in a similar manner.

If it were not for the leakage inductance, which limits the rate at which each half of this circuit can pick up the load current, and the harmonic content in the two resonant inductors' currents, the input and output filter elements 101 and 103 would not be needed. These imperfections are very slight, however, so a great deal is gained by going to the dual converter configuration 109.

The disadvantage of a dual converter is the duplication of several parts, but it should be remembered that each circuit now handles half the power. The two MOSFET's 105 of FIG. 9 require the same total die area as the original single MOSFET of FIGS. 4 and 6 to get equal conduction losses. The total energy that is lost in the charging and discharging of the two gate drives also remains the same. Each junction capacitance is halved, which is consistent with the factor of two change in characteristic impedance that must be made to the resonant circuit. The two resonant magnetizing inductors 107, which now must have twice the inductance value, store the same total energy as the original inductor 41 in FIG. 4 because their currents are halved. There are, therefore, no fundamental penalties associated with the dual converter other than the extra cost of interconnection.

One problem with the dual forward converter 109 of FIG. 9 is that it cannot, by itself, regulate the output voltage. To provide this necessary function, a special pre-regulator 111, shown in the schematic of FIG. 10a, has been devised. It is a scheme that takes advantage of the limited conversion ratio actually needed for regulation to permit efficient square-wave switching at a very high frequency. Since it operates at a fixed frequency, it is an approach that may also be valuable for the embodiment of FIG. 4 and the quasi-resonant circuits of prior art if frequency operation is undesirable.

Pre-regulator 111 is an up-converter that controls the voltage $V_{bus}$ on the main bus 125 presented to the dual forward-converter section. A controlled switch 113 of the up-converter is connected to a midpoint voltage $V_{mid}$ formed by splitting what was previously a single dc bus capacitor component of the input filter elements. Because the resulting capacitors 115, 117 are large, this midpoint 119 can be thought of as an incremental ground. Its voltage, $V_{mid}$, is chosen to be slightly below the lowest input voltage expected so that controllable switch 113 will be able to control power flow throughout the full range of steady-state operating conditions.

Two advantages result from this special connection. First, the semiconductor devices (i.e. the MOSFET's and rectifier diodes) are only subjected to the difference between the lowest and highest input voltage. Their rating is therefore lower, which makes it easier to achieve a desired on-state resistance with a smaller die-size and junction capacitance. It also means that switch transition losses, particularly those related to the energy stored in the junction capacitors, are greatly reduced. A very high switching frequency can therefore be used without substantial energy losses. Second, the ripple levels to which the filter elements are subjected are approximately half what they would be for a normal up-converter configuration. The result of these two features is that regulation can be efficiently achieved at a high frequency, even though a square-wave approach is followed and the filter elements are very small.

For example, assume that 50 watts is delivered from a system whose voltage ranges from 34V to 42V. When the voltage is at 38V, the input current is 1.3A. A MOSFET and Schottky diode designed for these ratings may have a combined capacitance of 200 pF, or less. The energy lost due to the charging and discharging of this capacitance is therefore only 6.4 nJ/cycle. The energy stored in a parasitic inductance (say, 10 nH) would give a loss of only 8.5 nJ/cycle. Finally, if each switch transition took 4 ns to complete, an additional 45 nJ/cycle would be lost. With these numbers, operation at 5 MHz would create only 0.3 watts of switching loss.

Of course, midpoint 119 is not a true ground, so the net charge flowing into it must be zero. Since the up-converter only delivers charge to this point, some other means must be provided to take it away. The transformers of the resonant forward converter provide this function quite easily. As can be seen in FIG. 10b, the midpoint 119 is connected to an appropriate tap 127 on each transformer 123 of the dual converter 109 through Schottky diodes 121. If the midpoint voltage $V_{mid}$ were too low, diodes 121 would be reverse-biased, and no charge would be removed. Since there would then be a net flow of charge into the midpoint 119, its voltage would increase until a level was reached where Schottky diodes 121 turned on during their respective halves of the cycle. On average, power would then be drawn from both the midpoint 119 and main bus 125 in the same proportion to which it was delivered by the up converter.

If only line regulation were required, the control circuit for this pre-regulator would only need to keep the difference between the main bus and the midpoint voltage at its correct value. The transformer taps would then assure that the midpoint voltage was also correct. However, there is a need to vary voltage $V_{bus}$ in response to changing load current, so some feedback loop from the output will also be needed. The power supply for this controller is conveniently gotten from the main bus. It is understood that pre-regulator 111 could also be a down converter similarly connected to midpoint $V_{mid}$ 119. Also, the pre-regulation scheme may be employed with other embodiments of the present invention.

Figure 10A:
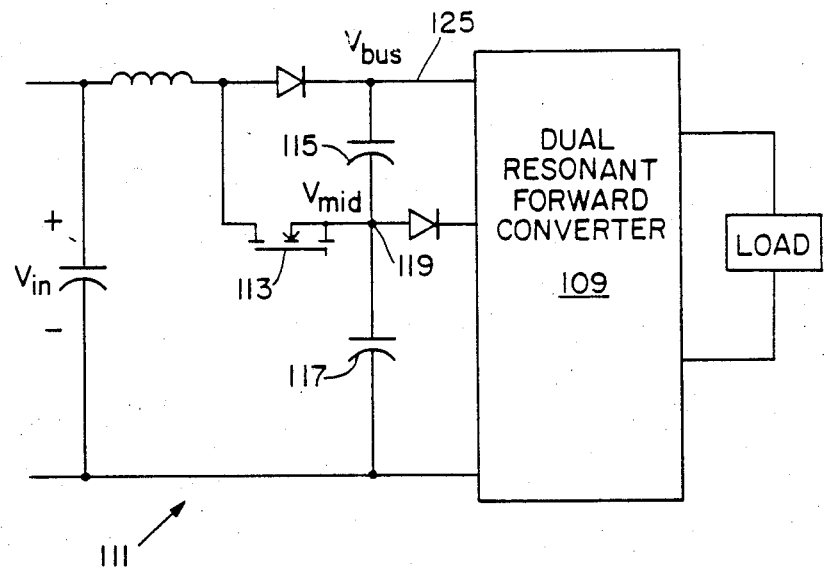
FIGS. 10a and b are schematics of electrical circuits of the embodiment of FIG. 9 with a pre-regulator.
Figure 10B:
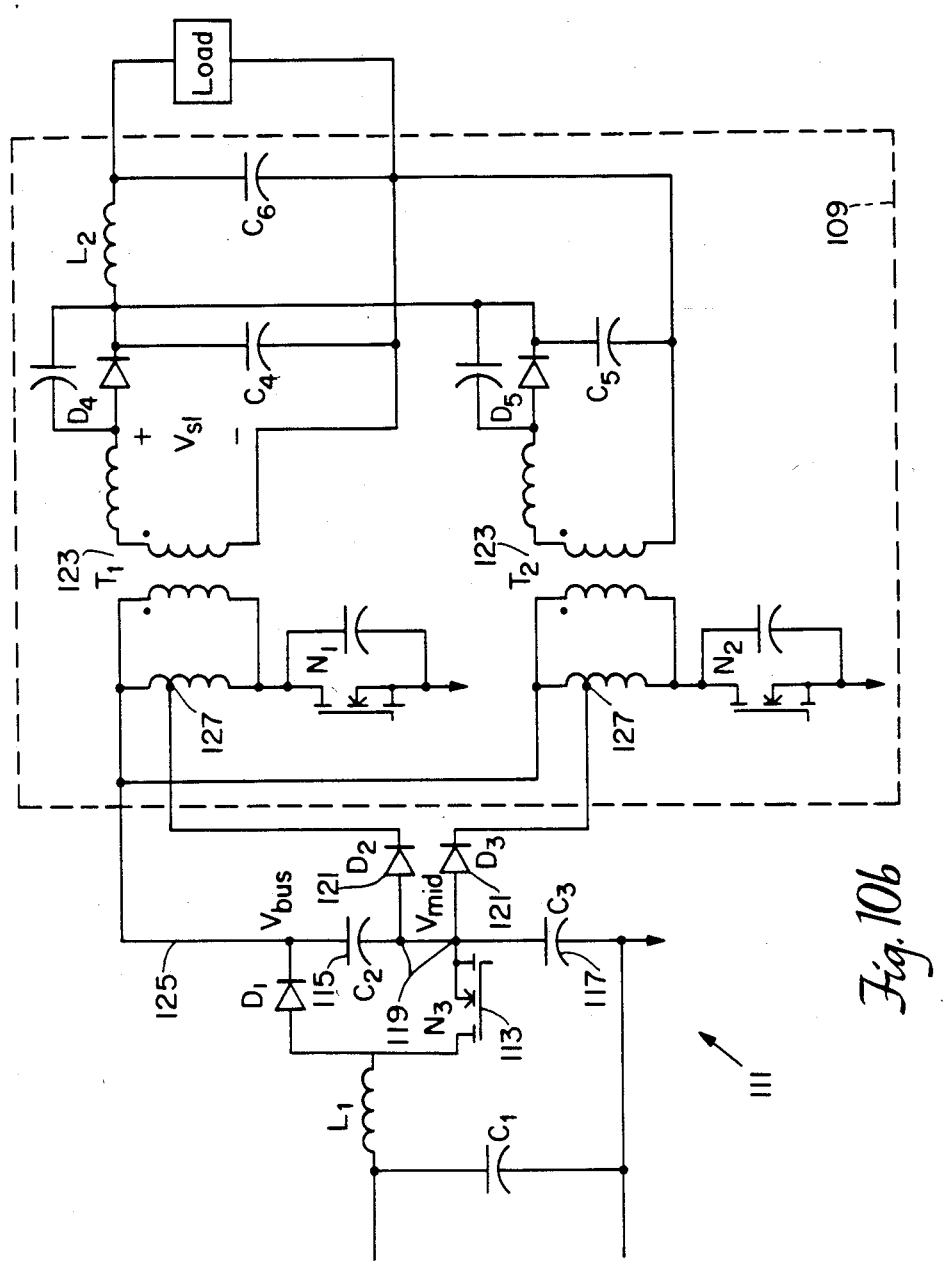

One exemplary embodiment of the dual resonant forward converter with a pre-regulator provided in FIGS. 10a and b is a 50W converter operating at a base frequency of 3.6 MHz. The switching frequency of the pre-regulator is 2 MHz. The schematic, component values and parts list corresponding to elements shown in FIG. 10b are as follows:

| | | |
|---|---|---|
| $C_1$ = 200 nF | $L_1$ = 30 μH | $N_1$ = IRF630 |
| $C_2$ = 300 nF | $L_2$ = 2 μH | $N_2$ = IRF630 |
| $C_3$ = 100 nF | $D_1$ = IR11DQ06 | $N_3$ = IRFD120 |
| $C_4$ = 30 nF | $D_2$ = IR11DQ06 | $T_1$ = $T_2$ |
| $C_5$ = 30 nF | $D_3$ = IR11DQ06 | = Ferroxcube |
| $C_6$ = 400 nF | $D_4$ = IR31DQ06 | 1107PA40 |
| | $D_5$ = IR31DQ06 | 12/9:3 |

The power circuit of this embodiment is constructed on a printed circuit board without regard for the heat-sinking of individual components. The overall dimensions of the circuit, which do not include its heatsink, are 1 9/16 in. long by 10/16 in. wide by ¾ in. high. The gate drive circuitry is mounted on a separate board.

Figure 11C:
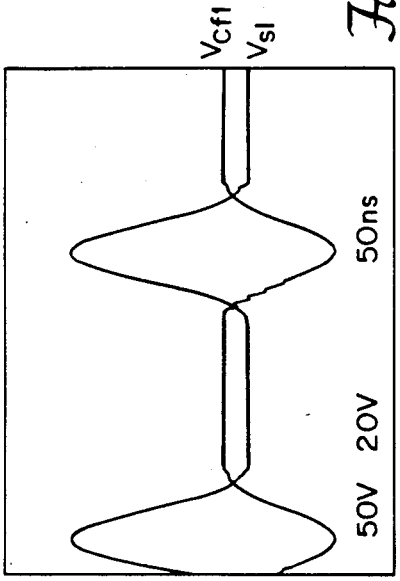
FIGS. 11a-d are waveforms of another existing embodiment of the present invention.
Figure 11D:
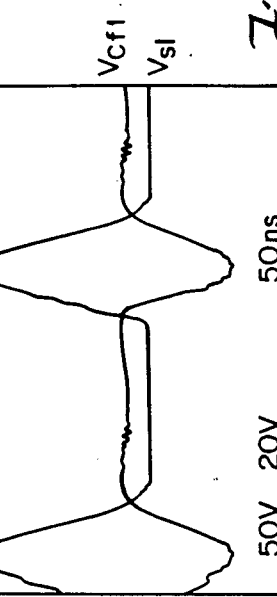
Figure 11A:
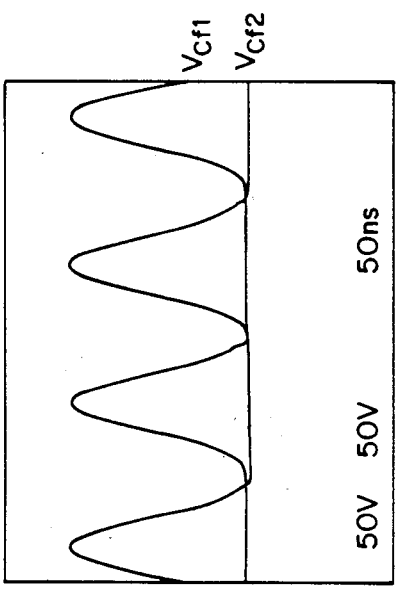
Figure 11B:
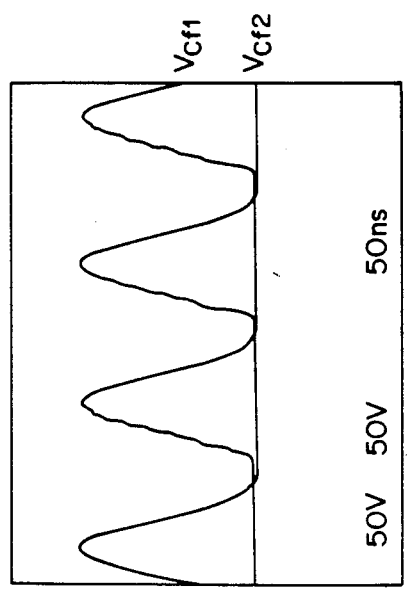

FIGS. 11a and 11b show the measured voltage waveforms of the dual converter's MOSFET's of FIG. 10b, at 0% and 100% power. As can be seen, these waveforms are very close to the simulated waveforms shown in earlier figures, and there is very little dependency of the peak voltage on load current. Notice the effects of the nonlinear junction capacitance on the MOSFET's voltage, the oscillations caused by the leakage inductance, and the balance between channels. FIGS. 11c and 11d show the voltage across one channel's MOSFET and secondary transformer winding (a good representation of the rectified voltage) for 10% and 100% load. Notice the high frequency ring in the secondary waveform.

The following Table 1 gives the measured efficiencies η for several power levels and input voltages of this embodiment where $d_{pr}$ is the percentage of time that the MOSFET of the pre-regulator is conducting.

| $d_{pr}$ | $V_{in}$ (volts) | $I_{in}$ (amps) | $P_{in}$ (watts) | $V_{out}$ (volts) | $P_{out}$ (watts) | η |
|---|---|---|---|---|---|---|
| 0 | 40 | .03 | 1.2 | 10 | 0 | |
| 0 | 40 | 1.48 | 59.2 | 8.17 | 49 | 83% |
| 1 | 31.3 | 1.95 | 61 | 8.17 | 49 | 80.3% |
| 0.5 | 35.4 | 1.7 | 60.2 | 8.17 | 49 | 81.4% |

Figure 12:
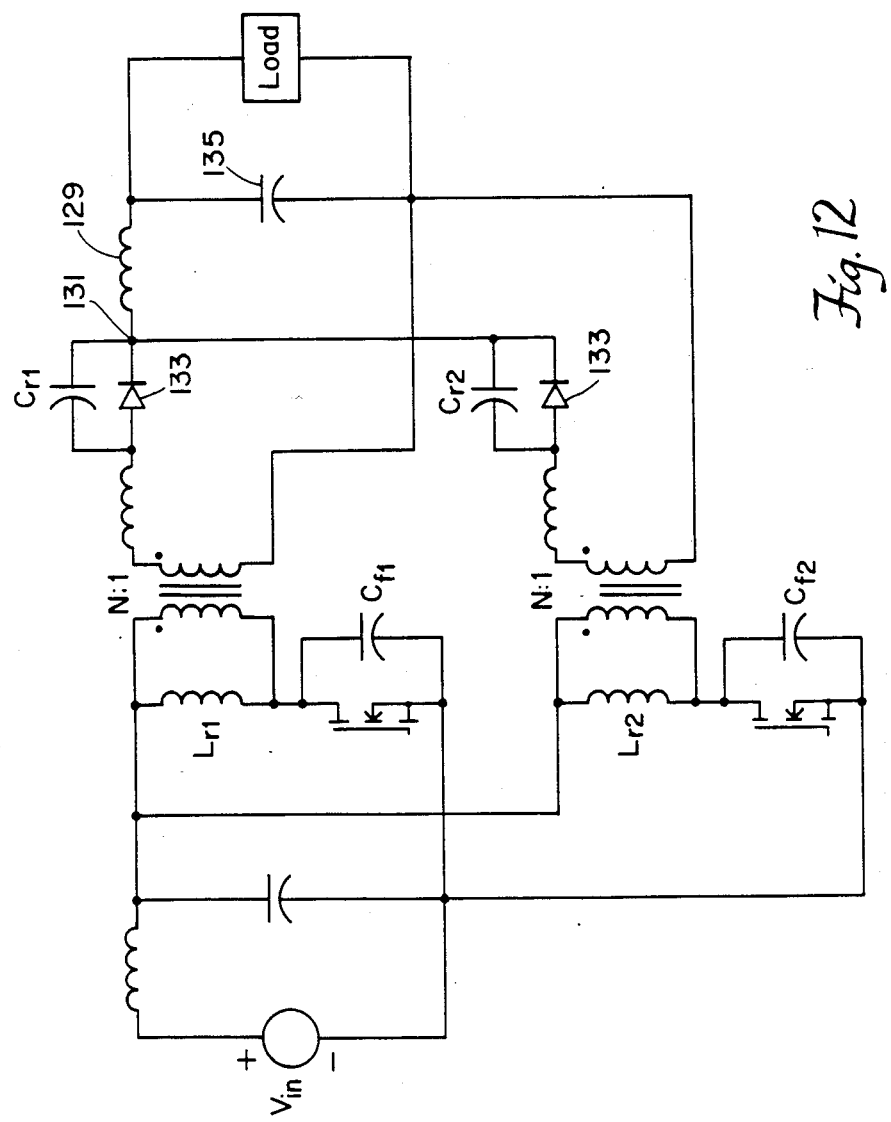
FIG. 12 is a schematic of an electrical circuit of an embodiment of the invention which has an inductor as the first element in the output filter.

It is understood that the dual converter of the present invention may also deliver a current source output as opposed to a voltage source output. This is accomplished, as shown in FIG. 12, by placing a series inductor 129 between the common node 131 of the output diodes 133 and capacitor filter element 135 which is connected between common node 131 and ground. The operation of the circuit is substantially the same as previously described.

Figure 13B:
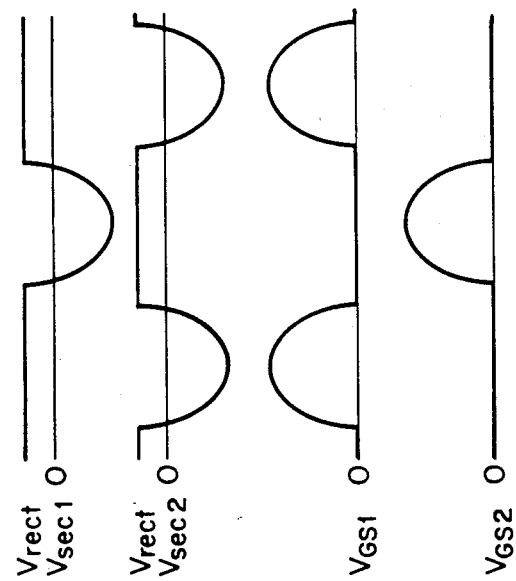
Figure 13A:
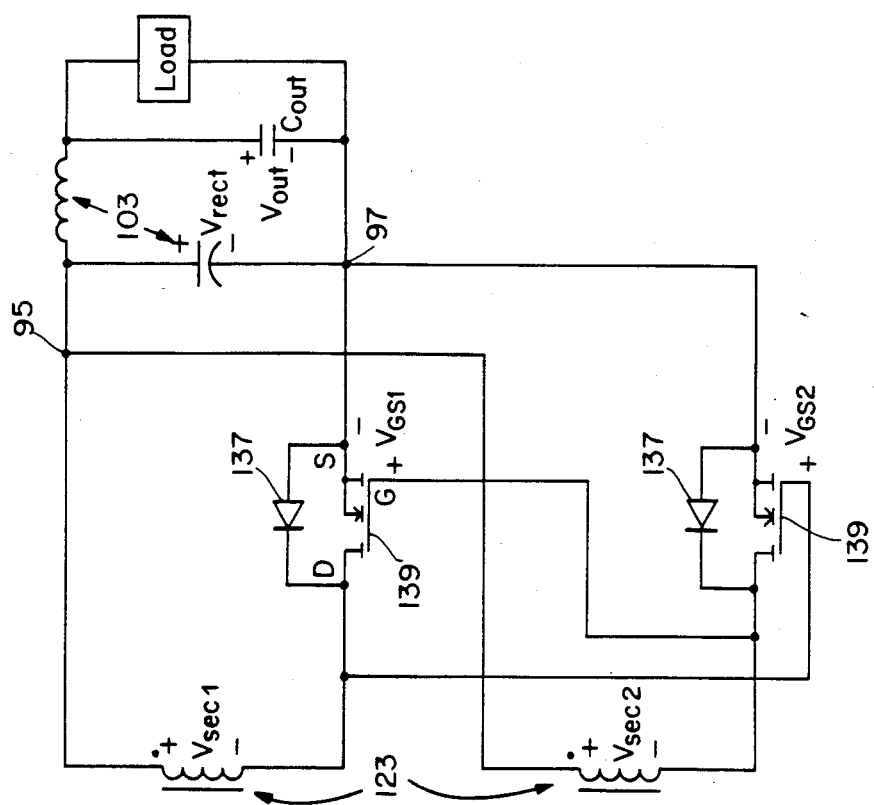
FIG. 13a is a schematic of an electrical circuit of the embodiment of FIG. 9 modified to reduce conduction losses by using synchronous rectifiers.

In addition, the secondary side diodes 137 of dual converter 109 of FIG. 9 may be replaced or placed in parallel, with controllable switches 139 (preferably MOSFET's) to reduce conduction losses as shown in FIG. 13a. Conventionally, these switches are referred to as synchronous rectifiers. The gates of each switch 139 are cross coupled to the secondary winding of the transformer of the opposite converter. The circuit operates in generally the same manner as described previously. However, the gate drives of the additional secondary-side switches must be properly timed; and it must be noted that charging and discharging of the capacitive gates at a 10 MHz repetition rate cause too much dissipation if the energy is not recovered. The connection of the MOSFET's gates 139 shown in FIG. 13a both assure proper timing and recover the gate energy because the gate capacitance is incrementally in parallel with the converter's resonance capacitor as shown by the waveforms shown in FIG. 13b.

As generalized previously, it is felt that a leakage inductance on the order of 1–2% of the transformer magnetizing inductance can be tolerated by the resonant forward converter topology of FIG. 6 without unacceptable degradation in performance. If this were unattainable, however, there is a modification that can be made to the basic topology of the present invention that mitigates the deleterious effects of the leakage inductance. This modified resonant forward converter topology utilizes the leakage inductance in an additional resonance which occurs during the MOSFET on-time. This new topology eliminates the commutation delay and therefore allows switches to operate with benign turn-off, as well as turn-on, transitions.

Figure 14:
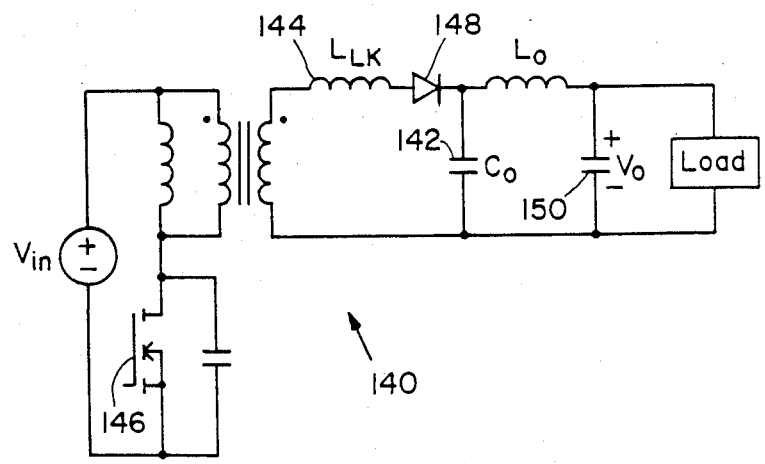
FIG. 14 is a schematic of an electrical circuit of another embodiment of the invention.

The modified resonant forward converter 140 is shown in its basic form in FIG. 14. This is topologically identical to a basic resonant forward converter of FIG. 4 with a capacitor-inductor L-section output filter ($C_o$, $L_o$) connected in series with the rectifier 148 and the load in parallel with output capacitor 150. The functional difference arises because a much smaller value capacitor 142 is used in this case for $C_8$. Instead of being so large that its' voltage remains constant throughout the cycle, this output filter capacitor 142 is now sized to ring with the leakage inductance 144, $L_{lk}$, at a frequency slightly higher that the switching frequency. When the MOSFET 146 is off and the main resonant ring is occurring, the operation of this circuit is essentially the same as before, with the only difference being the absence of the load current related second order effects described in FIGS. 6 and 7.

Figure 15A:
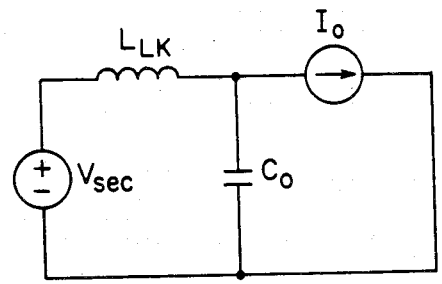
FIG. 15a is a schematic of an equivalent circuit of FIG. 14 during the on-time of the resonant switch.
Figure 15B:
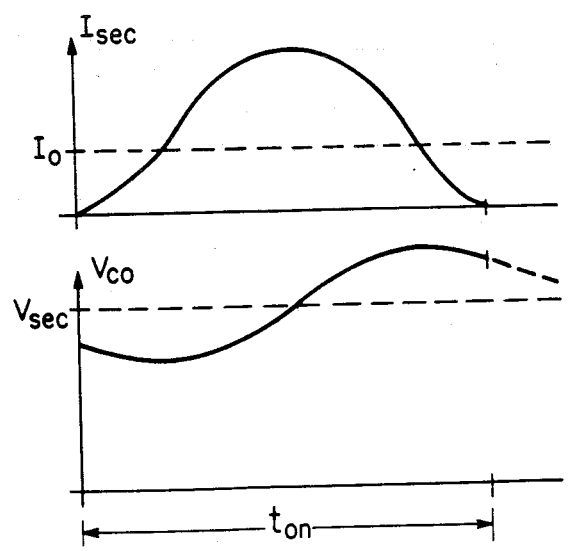

During the on-time of MOSFET 146, however, the converter 140 can be modeled by the equivalent circuit of FIG. 15a, with the operating waveforms shown in FIG. 15b. In FIG. 15a the current source to $I_o$ represents the series output inductor connected to the parallel output capacitor 150 and load. The voltage source $V_{sec}$ represents the transformers secondary winding.

As the waveforms in FIG. 15b show, the secondary current $I_{sec}$ rings around a value equal to the load current $I_o$, and the capacitor voltage $V_{co}$ rings around a value equal to the transformer secondary voltage $V_{sec}$.

Eventually, the secondary current $I_{sec}$ rings down to zero and is prevented from going negative by rectifier 148. At this point the primary MOSFET 146 can be turned off, and the main resonant ring will start with only the transformer's magnetizing current charging the resonant capacitor, and with the rectifier capacitance in parallel with the MOSFET capacitance from the start of the ring. In addition to the benign turn-off transition, this modified topology avoids the leakage inductance's contribution to load regulation because the average of the volt-seconds applied to the leakage inductance during the on-time is zero. In fact, because the average voltage across the output filter capacitor 142 must equal the dc output voltage, and the average value of the capacitor voltage during the off-time is the same as that during the on-time, it follows that the dc output voltage $V_o$ must equal the secondary voltage during the MOSFET's on-time $V_{sec}$, independent of load.

There are two independent resonant actions in this modified topology, but both of the resonant frequencies must be in a fixed proportion to the switching frequency. This requires four precise components $L_m$, ($C_f + C_r$), $L_{lk}$, $C_o$. Two of these components are parasitics, namely the switches' combined capacitance and the leakage inductance, and therefore require careful control to give consistent results.

Another penalty associated with resonant secondary resonant forward converter 140 is that the rms value of the secondary current is higher in this modified topology, which then leads to additional conduction losses in components on both the primary and secondary sides. The rms current is in fact 20% higher than an ideal square wave and 4% higher than a sawtooth waveform with the same average values. The exponential waveform of the basic resonant converter of FIG. 4 falls somewhere between these limits depending on the ratio of the switching period to the L/R time constant of the secondary current. The increase in conduction losses is a penalty that may well be worth paying for the other advantages achieved.

Figure 16:
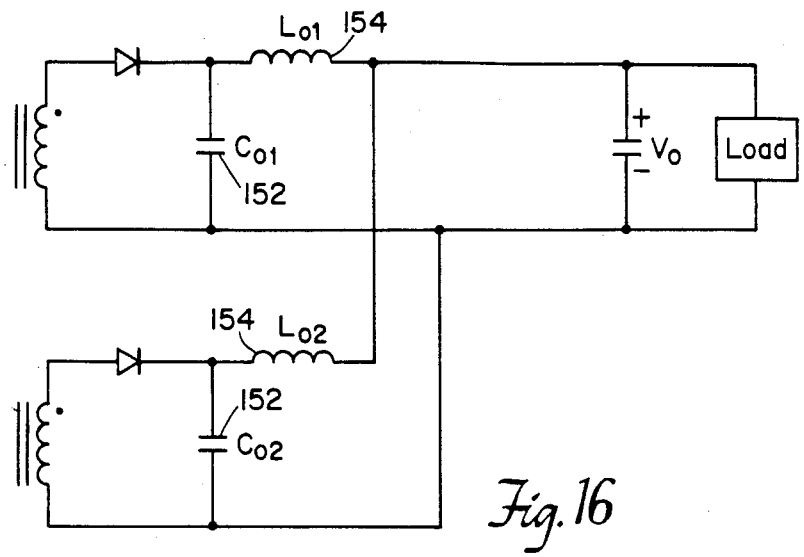
FIG. 16 is a schematic of an electrical circuit of the secondary side of the dual resonant forward converter of FIG. 9 with output filter elements.

For the basic resonant forward converter of FIG. 4, a dramatic saving in the input and output filtering requirements was achieved by configuring two identical units in parallel and operating them 180 degrees out of phase as in FIG. 9. This technique is not as effective when applied to the resonant secondary resonant forward converter of FIG. 14 since each unit requires its own output capacitance 152 and filter inductor 154 as shown in FIG. 16. The drawback is not only in the increased complexity of the combined output filter but also in the increased energy storage requirements as the filter inductors 154 must be designed for an energy that is much greater than the ripple energy.

Figure 17:
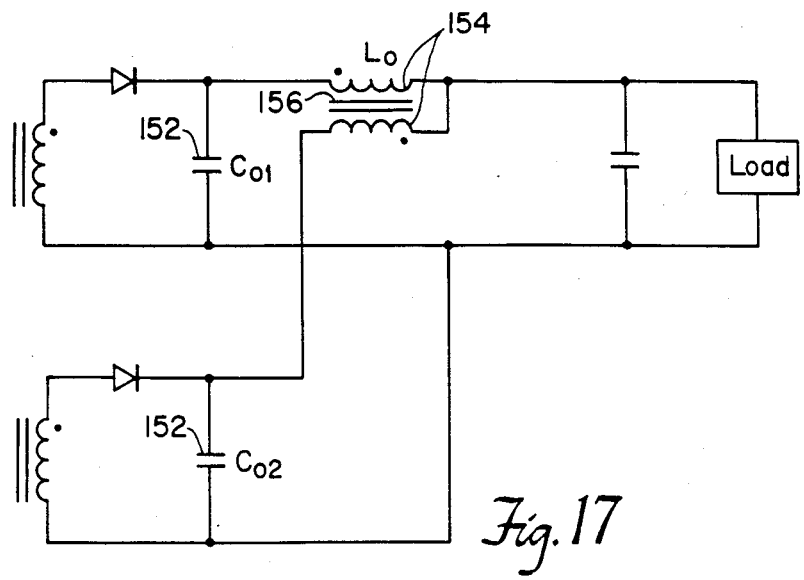
FIG. 17 is a schematic of an electrical circuit of the secondary side of another dual resonant forward converter embodying the present invention.

Because the two units of the dual converter of FIG. 9 are operating out of phase, it is possible to couple the two filter inductors about a common core 156 as shown in FIG. 17. This means that the combined inductor 154 can be designed to store only the ripple energy, which allows a more efficient and physically smaller component. Coupling the output inductors 154 in this fashion is analagous to the use of interphase transformers to couple power-frequency (50–60 Hz) six-pulse rectifier circuits.

While all of the topologies described above present zero-voltage switch transitions at both turn-on and turn-off, the turn-off transition is by far the more stressful of the two. During this interval of the cycle, it is important to avoid linear operation of the MOSFET due to the feedback effect of the drain-gate capacitance. Unless a negative gate drive voltage is available, therefore, both the resistance and the inductance of the turn-off drive must be very low, particularly if the threshold of the MOSFET is reduced to save gate power. To meet this need, the turn-off driver may be integrated on the power die as disclosed by and incorporated herein by reference in "A Low Capacitance Power MOSFET with an Integral Gate Driver", by Joseph Bernstein, Sandeep Baahl and Martin Schlecht, MIT.

With regard to the magnetic components, the transformer represents the most difficult challenge. The small skin depth in the copper and the low flux levels allowable in ferrite at this frequency complicate the design. Proximity effects are also significant. Leakage inductance must be kept very small without sacrificing coupling capacitance and electrical isolation. Further, it is desired that the final structure be mass-producible with parameters that are consistent from sample to sample. The present invention thus uses flexible printed circuit boards sandwiched between slabs of ferrite. Other materials, however, are suitable.

In addition, ceramic capacitor technology appears to be adequate for the power circuit of the present invention because only dc filter elements that see very little voltage ripple are needed. Type II ceramics, which are quite small, may therefore be used. Since they are not involved in a resonant ring, but rather are required to be "infinitely large", there is little concern for the stability of their capacitance value.

The typical construction of the circuit requires great care. Applicants use thick-film fabrication to keep the components tightly spaced and adequately cooled. Applicants also make interconnections with very low parasitic inductance, particularly on the low voltage side.

While the invention has been particularly shown and described with reference to embodiments thereof, it will be understood by those skilled in the art that various changes in form and details may be made therein without departing from the spirit and scope of the invention as defined by the appended claims.

We claim:

1. A resonant forward converter for converting voltage from an input dc voltage source to an output dc voltage for delivery to a load comprising:

a transformer having a primary and secondary winding wound about a common core element in which the polarities of the windings are matched, said transformer having a magnetizing inductor connected in parallel across one of said windings to provide a resonant ring independent of the load, the magnetizing inductor being naturally supplied by a magnetizing inductance of the transformer;

switching means connected in series with said primary winding and said input dc voltage source for alternately switching current on and off at a rapid rate through a first series circuit, said switching means causing, when it is turned off, a ring between the magnetizing inductopr and a first capacitor means coupled in parallel with the switching means; said first series circuit comprising the input dc voltage source, the primary winding of said transformer and the switching means in parallel with said first capacitor means; and a second series circuit comprising said secondary winding of the transformer in series with a first unilateral conducting means, a parallel output capacitor and said load, said first unilateral conducting means having a second capacitor means coupled in parallel therewith, such that the first unilateral conducting means acts in unison with the switching means, both being turned on at about the same time and off at about the same time, the second capacitor means acting in parallel with the first capacitor means during the resonant ring.

2. A resonant forward converter as claimed in claim 1 wherein the switching means includes a MOSFET.

3. A resonant forward converter as claimed in claim 1 wherein the first unilateral conducting means includes a diode.

4. A resonant forward converter as claimed in claim 1 further comprising a leakage inductor connected in series with one of the windings of the transformer, the leakage inductor being naturally supplied by leakage inductance of the transformer which is negligibly small relative to the magnetizing inductance such that the first unilateral conducting means and the switching means both have zero voltage switching transitions.

5. A resonant forward converter as claimed in claim 4 wherein the switching means is a MOSFET.

6. A resonant forward converter as claimed in claim 4 wherein the first unilateral conducting means is a diode.

7. A resonant forward converter as claimed in claim 4 further comprising a second unilateral conducting means connected in series with a third capacitor means, the serially connected second unilateral conduction means and the third capacitor means connected in parallel with the switching means, the third capacitor means charged to a voltage above a peak voltage of the switching means such that the second unilateral conducting means is in a non-conducting state under steady state conditions and capacitance of the second unilateral conducting means increases with increasing voltage of the switching means to reduce the peak voltage of the switching means.

8. A resonant forward converter as claimed in claim 7 wherein the second unilateral conducting means maintains the voltage across the third capacitor means.

9. A resonant forward converter as claimed in claim 7 wherein the second unilateral conducting means is a diode which enables the voltage across the third capacitor means to be self-regulating.

10. A resonant forward converter as claimed in claim 4 further comprising circuit means for pre-regulating the voltage presented to the first series circuit.

11. A resonant forward converter as claimed in claim 10 wherein the circuit means for pre-regulating the input voltage includes:

a main bus leading to the resonant forward converter;

an inductor connected in series with the input voltage source and a first diode, the first diode connected to the main bus, a node being formed where the inductor and the first diode connect;

a controllable switch connected between the node and a midpoint of the main bus, the midpoint formed by two capacitors placed in series; and a unidirectional conducting means connected in series with the midpoint and a tap on the primary winding of the transformer such that the input voltage may have a limited range while the voltage of the main bus and the midpoint is controlled by the controllable switch and the unidirectional conducting means.

12. A resonant forward converter as claimed in claim 11 wherein the unidirectional conducting means of the circuit means for pre-regulating the input voltage includes a second diode.

13. A resonant forward converter as claimed in claim 4 wherein the leakage inductor is connected to the secondary winding of the transformer.

14. A resonant forward converter as claimed in claim 4 wherein the output capacitor has a sufficiently low capacitance such that its voltage varies causing current through the leakage inductor to rise to a peak value and then decrease toward zero when the switching means is on, and causing a smaller value of current in the leakage inductor at the time the switching means is turned off.

15. A resonant forward converter as claimed in claim 1 further comprising a second unilateral conducting means connected in series with a third capacitor means, the serially connected second unilateral conducting means and third capacitor means connected in parallel with the switching means, the third capacitor means charged to a voltage above a peak voltage of the switching means such that capacitance of the second unilateral conducting means increases with increasing switching means voltage to reduce the peak switching means voltage.

16. A resonant forward converter as claimed in claim 15 wherein the second unilateral conducting means maintains the voltage across the third capacitor means.

17. A resonant forward converter as claimed in claim 15 wherein the second unilateral conducting means is a forward biased diode which enables the voltage across the third capacitor means to be self-regulating.

18. A resonant forward converter as claimed in claim 1 further comprising circuit means for pre-regulating the voltage presented to the first series circuit.

19. A resonant forward converter as claimed in claim 18 wherein the circuit means for pre-regulating the input voltage includes:

a main bus leading to the resonant forward converter;

an inductor connected in series with the input voltage source and a first diode, the first diode connected to the main bus, a node being formed where the inductor and the first diode connect;

a controllable switch connected between the node and a midpoint of the main bus, the midpoint formed by two capacitors placed in series; and a unidirectional conducting means connected in series with the midpoint and a tap on the primary winding of the transformer such that the input voltage has a limited range while voltage of the main bus and the midpoint is controlled by the controllable switch and unidirectional conducting means.

20. A resonant forward converter as claimed in claim 19 wherein the unidirectional conducting means of the pre-regulating circuit includes a second diode.

21. A dual resonant forward converter for converting voltage from an input dc voltage source to an output dc voltage for delivery to a load comprising:

two transformers each having a primary and secondary winding wound about a core element in a manner in which the polarities of the windings are matched, each transformer having a magnetizing inductor connected in parallel across one of its windings to provide a respective resonant ring independent of the load, each magnetizing inductor being naturally supplied by a magnetizing inductance of the respective transformer;

two switching means, one connected in series with the primary winding of one transformer and the input dc voltage source for alternately switching current on and off at a rapid rate through a first series circuit, the second switching means connected in series with the primary winding of the second transformer and the input dc voltage source for alternately switching current on and off at a rapid rate through a second series circuit, each switching means causing, when it is turned off, a ring between the respective magnetizing inductor of the transformer to which the switching means is connected and a first capacitor means coupled in parallel with the switching means;

said first series circuit comprising the input dc voltage source, the primary winding of the one transformer, and the one switching means in parallel with the respective first capacitor means;

said second series circuit comprising the input dc voltage source, the primary winding of the second transformer, and the second switching means in parallel with its respective first capacitor means;

a third series circuit comprising the secondary winding of the one transformer in series with a first unidirectional conducting means, a common node, a first parallel output capacitor and said load, said first unidirectional conducting means having a second capacitor means coupled in parallel therewith such that the first unidirectional conducting means acts in unison with the one switching means, both being turned on and off at about the same time, and the first capacitor means of the first series circuit acting in parallel with the second capacitor means during the respective ring; and a fourth series circuit comprising the secondary winding of the second transformer in series with a second unidirectional conducting means, the common node, the first parallel output capacitor, and said load, said second unidirectional conducting means having a third capacitor means coupled in parallel therewith such that the second unidirectional means acts in unison with the second switching means, both being turned on and off at about the same time, the first capacitor means of the second series circuit acting in parallel with the third capacitor means during the respective ring.

22. A dual resonant forward converter as claimed in claim 21 wherein the two switching means each include a MOSFET.

23. A dual resonant forward converter as claimed in claim 21 wherein the first and second unidirectional conducting means each include a diode.

24. A dual resonant forward converter as claimed in claim 26 further comprising:
- two leakage inductors, one connected in series with one of the windings of the one transformer the second connected in series with one of the windings of thge second transformer;
- each leakage inductor being supplied by a leakage inductance of the respective transformer, the leakage inductance being negligibly small relative to the magnetizing inductance of the respective transformer such that the first and second unidirectional conducting means and the two switching means all have zero voltage switching transitions.

25. A dual resonant forward converter as claimed in claim 16 further comprising an inductor connected in series between the common node and the load such that the output dc voltage is a current source output.

26. A dual resonant forward converter as claimed in claim 24 wherein the first and second unidirectional conducting means are first and second synchronous rectifiers respectively for providing a reduction in conduction losses, a gate of the first synchronous rectifier cross couples to the secondary winding of the second transformer and a gate of the second synchronous rectifier cross couples to the secondary winding of the one transformer.

27. A dual resonant forward converter as claimed in claim 24 further comprising:
- a third unidirectional conducting means in series with a fourth capacitor means both connected in parallel with the one switching means; and
- a fourth unidirectional conducting means in series with a fifth capacitor means, both connected in parallel with the second switching means, the fourth and fifth capacitor means charged to a voltage above a peak voltage of the respective switching means such that capacitance of the third and fourth unidirectional conducting means increase with increasing voltage of the respective switching means to reduce the peak voltage of the respective switching means.

28. A dual resonant forward converter as claimed in claim 27 wherein the voltages across the fourth and fifth capacitor means are self-regulated by the respective third and fourth unidirectional conducting means.

29. A dual resonant forward converter as claimed in claims 24 further comprising circuit means for pre-regulating the voltage presented to the first and second series circuits.

30. A dual resonant forward converter as claimed in claim 29 wherein the circuit means for pre-regulating the input voltage includes:
- a main bus leading to the dual resonant converters;
- an inductor connected in series with the input voltage source and a first diode, the first diode connected to the main bus;
- a controllable switch connected between a node where the inductor and the first diode connect and a midpoint of the main bus formed by two capacitors placed in series, the midpoint connected to second and third diodes, the second diode connected to a first tap on the primary winding of the one transformer and the third diode connected to a second tap on the primary winding of the second transformer such that the input voltage may have a limited range while voltage of the main bus and the midpoint is controlled by the controllable switch and the second and third diodes connected to respective taps.

31. A dual resonant forward converter as claimed in claim 24 wherein the one leakage inductor is connected to the secondary winding of the one transformer and the second leakage inductor is connected to the secondary winding of the second transformer.

32. A dual resonant forward converter as claimed in claim 24 further comprising:
- a second parallel output capacitor and a first output inductor connected to the third series circuit between the first unidirectional conducting means and the common node; and
- a third parallel output capacitor and a second output inductor connected to the fourth series circuit between the second unidirectional conducting means and the common node; such that the second and third parallel output capacitors have sufficiently low capacitances so that their voltages vary causing current through each of the two leakage inductors to rise to a peak value and then decrease toward zero when the respective switching means is on, and causing a smaller value of current in each leakage inductor when the respective switching means is turned off.

33. A dual resonant forward converter as claimed in claim 24 further comprising:
- a second parallel output capacitor and a first output inductor connected to the third series circuit between the common node and the first parallel output capacitor causing current through each of the two leakage inductors to rise to a peak value and then decrease toward zero when the respective switching means is on, and causing a smaller value of current in each leakage inductor when the respective swaitching means is turned off.

34. A dual resonant forward converter as claimed in claim 21 wherein the first and second unidirectional conducting means are first and second synchronous rectifiers respectively for providing a reduction in conduction losses, a gate of the first synchronous rectifier cross coupled to the secondary winding of the second transformer and a gate of the second synchronous rectifier cross coupled to the secondary winding of the one transformer.

35. A dual resonant forward converter as claimed in claim 21 further comprising:
- a third unidirectional conducting means in series with a fourth capacitor means both connected in parallel with the one switching means; and
- a fourth unidirectional conducting means in series with a fifth capacitor means, both connected in parallel with the second switching means, the fourth and fifth capacitor means charged to a voltage above a peak voltage of the respective switching means such that capacitance of the third and fourth unidirectional conducting means increase with increasing voltage of the respective switching means to reduce the peak voltage of the respective switching means.

36. A dual resonant forward converter as claimed in claim 35 wherein the voltages across the fourth and fifth capacitor means are self-regulated by the respective third and fourth unidirectional conducting means.

37. A dual resonant forward converter as claimed in claim 21 further comprising circuit means for pre-regulating the voltage presented to the first and second series circuits.

38. A dual resonant forward converter as claimed in claim 37 wherein the circuit means for pre-regulating the input voltage includes
   a main bus leading to the dual resonant converter;
   an inductor connected in series with the input voltage source and a first diode, the first diode connected to the main bus, a node being formed where the inductor and the first diode connect;
   a controllable switch connected between the node and a midpoint of the main bus formed by two capacitors placed in series, the midpoint connected to second and third diodes, the second diode connected to a first tap on the primary winding of the one transformer and the third diode connected to a second tap on the primary winding of the second transformer such that the input voltage may have a limited range while voltage of the main bus and midpoint is controlled by the controllable switch and the second and third diodes.

39. A method of converting a dc voltage source to an output dc voltage for delivery to a load, the steps comprising:
   switching current alternately on and off at a rapid rate through a series circuit of a resonant forward converter having a transformer with a primary and secondary winding wound about a core element with matching polarity, a first inductor connected in parallel across one winding of the transformer to provide a resonant ring independent of the load;
   a unilateral conducting device connected in series between the secondary winding and the load, the series circuit including the voltage source and the primary winding of the transformer; and
   switching the unilateral conducting device alternately on and off respectively at the same time as the the switching on and off of the current through the series circuit.

40. A method as claimed in claim 39 wherein the step of switching current alternately on and off at a rapid rate includes closing and opening a controllable switch at a rapid rate.

41. A method as claimed in claim 40 wherein the step of switching the unilateral conducting device alternately on and off includes biasing the diode forward and backward respectively with the switching on and off of the controllable switch.

42. A method as claimed in claim 40 further comprising the step of passing a leakage inductance through a second inductor connected in series with one of the windings of the transformer, the leakage inductance being negligibly small relative to the magnetizing inductance passed through the first inductor such that the unilateral conducting device and the controllable switch have zero voltage switching transition.

43. A method as claimed in claim 40 further comprising the step of reducing peak voltage across the controllable switch by connecting in parallel with the controllable switch a diode in series with a capacitor, the capacitor being charged to a voltage above the peak voltage of the switch and the diode capacitance increasing with increasing voltage across the switch.

44. A method of converting a dc voltage source to an output dc voltage for delivery to a load, the steps comprising:
   switching current alternately on and off at a rapid rate through two series circuits of a resonant forward converter having two transformers each with a primary and secondary winding wound about a core element with matching polarity, two first inductors one connected in parallel across one winding of one transformer to provide a resonant ring independent of the load, and the second connected in parallel across the winding of the second transformer to provide a resonant ring independent of the load;
   two unilateral conducting devices, one connected in series between the secondary winding of the one transformer and the load, the other connected in series between the secondary winding of the second transformer and the load, the two series circuits each including the voltage source and the primary winding of the respective transformer; and
   switching two unilateral conducting devices alternately on and off respectively at the same time as the switching on and off of the current through the two series circuits.

45. A circuit for pre-regulating input voltage to a converter having a transformer with a primary winding, the circuit comprising:
   a main bus leading to the converter;
   an inductor connected in series with a first diode, the first diode connected to the main bus;
   a controllable switch connected in series with the inductor and a midpoint of the bus, the midpoint formed by two capacitors;
   a unilateral conducting means connected in series with the midpoint and a tap on the primary winding of the transformer such that the input voltage may have a limited range while volage of the midpoint is controlled by the controllable switch and unilateral conducting means.

46. A circuit as claimed in claim 45 wherein the unilateral conducting means includess a second diode.

47. A circuit for pre-regulating input voltage from a source to a converter having a transformer with a primary winding, the circuit comprising:
   a main bus leading to the converter;
   a first element connected in series with the source and a second element, the second element connected to the main bus, a node being formed where the first element and the second element connect;
   a third element connected between the node and a midpoint of the main bus, the midpoint formed by two capacitors placed in series; and
   a unilateral conducting means connected in series with the midpoint and a tap on the primary winding of the transformer such that the input voltage may have a limited range while voltage of the midpoint is controlled by one of the elements and the unilateral conducting means.

48. A circuit as claimed in claim 47 wherein
   the first element includes an inductor and the second element includes a first diode; and
   the third element is a controllable switch which, with the unilateral conducting means, controls the voltage of the midpoint.

49. A circuit as claimed in claim 48 wherein the unilateral conducting means includes a second diode.

50. A circuit as claimed in claim 47 wherein
   the first element includes a switch and the second element includes an inductor, the switch and unilateral conducting means controlling the voltage of the midpoint; and
   the third element is a first diode.

51. A circuit as claimed in claim 50 wherein the unilateral conducting means includes a second diode.

52. A dual resonant forward converter for converting voltage from an input dc voltage source to an output dc voltage for delivery to a load comprising:
- two transformers each having a primary and secondary winding wound about a core element in a manner in which the polarities of the windings are matched, each transformer having a magnetizing inductor connected in parallel across one of its windings to provide a respective resonant ring independent of the load, each magnetizing inductor being naturally supplied by a magnetizing inductance of the respective transformer;
- two switching means, one connected in series with the primary winding of one transformer and the input dc voltage source for alternately switching current on and off at a rapid rate through a first series circuit, the second switching means connected in series with the primary winding of the second transformer and the input dc voltage source for alternately switching current on and off at a rapid rate through a second series circuit, each switching means causing, when it is turned off, a ring between the respective magnetizing inductor of the transformer to which the switching means is connected and a first capacitor means coupled in parallel thereto with the switching means;
- said first series circuit comprising the input dc voltage source, the primary winding of the one transformer, and the one switching means in parallel with the respective first capacitor means;
- said second series circuit comprising the input dc voltage source, the primary winding of the second transformer, and the second switching means in parallel with its respective first capacitor means;
- a third series circuit comprising the secondary winding of the one transformer in series with a first synchronous rectifier, a common node, a first parallel output capacitor and said load, said first synchronous rectifier having a second capacitor means coupled in parallel therewith such that the first synchronous rectifier acts in unison with the one switching means, both being turned on and off at about the same time, and the first capacitor means of the first series circuit acting in parallel with the second capacitor means during the respective ring;
- a gate of the first synchronous rectifier cross coupling to the secondary winding of the second transformer;
- a fourth series circuit comprising the secondary winding of the second transformer in series with a second synchronous rectifier, the common node, the first parallel output capacitor, and said load, said second synchronous rectifier having a third capacitor means coupled in parallel therewith such that the second synchronous rectifier acts in unison with the second switching means, both being turned on and off at about the same time, the first capacitor means of the second series circuit acting in parallel with the third capacitor means during the respective ring;
- a gate of the the second synchronous rectifier cross coupling to the secondary winding of the one transformer, the first and second synchronous rectifiers providing a reduction in conduction losses;
- two leakage inductors, one connected in series with one of the windings of the one transformer, the second connected in series with one of the windings of the second transformer; and
- each leakage inductor being supplied by a leakage inductance of the respective transformer, the leakage inductance being negligibly small relative to the magnetizing inductance of the respective transformer such that the first and second synchronous rectifiers and the two switching means all have zero voltage switching transitions.

53. A dual resonant forward converter for converting voltage from an input dc voltage source to an output dc voltage for delivery to a load comprising:
- two transformers each having a primary and secondary winding wound about a core element in a manner in which the polarities of the windings are matched, each transformer having a magnetizing inductor connected in parallel across one of its windings to provide a respective resonant ring independent of the load, each magnetizing inductor being naturally supplied by a magnetizing inductance of the respective transformer;
- two switching means, one connected in series with the primary winding of one transformer and the input dc voltage source for alternately switching current on and off at a rapid rate through a first series circuit, the second switching means connected in series with the primary winding of the second transformer and the input dc voltage source for alternately switching current on and off at a rapid rate through a second series circuit, each switching means causing, when it is turned off, a ring between the respective magnetizing inductor of the transformer to which the switching means is connected and a first capacitor means coupled in parallel thereto with the switching means;
- said first series circuit comprising the input dc voltage source, the primary winding of the one transformer, and the one switching means in parallel with the respective first capacitor means;
- said second series circuit comprising the input dc voltage source, the primary winding of the second transformer, and the second switching means in parallel with its respective first capacitor means;
- a third series circuit comprising the secondary winding of the one transformer in series with a first unidirectional conducting means, a common node, a first parallel output capacitor and said load, said first unidirectional conducting means having a second capacitor means coupled in parallel therewith such that the first unidirectional conducting means acts in unison with the one switching means, both being turned on and off at about the same time, and the first capacitor means of the first series circuit acting in parallel with the second capacitor means during the respective ring;
- a fourth series circuit comprising the secondary winding of the second transformer in series with a second unidirectional conducting means, the common node, the first parallel output capacitor, and said load, said second unidirectional conducting means having a third capacitor means coupled in parallel therewith such that the second unidirectional means acts in unison with the second switching means, both being turned on and off at about the same time, the first capacitor means of the second series circuit acting in parallel with the third capacitor means during the respective ring;
- two leakage inductors, one connected in series with one of the windings of the one transformer, the second connected in series with one of the windings of the second transformer;

each leakage inductor being supplied by a leakage inductance of the respective transformer, the leakage inductance being negligibly small relative to the magnetizing inductance of the respective transformer such that the first and second unidirectional conducting means and the two switching means all have zero voltage switching transitions; and circuit means for pre-regulating the voltage presented to the first and second series circuits.

54. A dual resonant forward converter as claimed in claim 53 wherein the circuit means for pre-regulating the input voltage includes:

a main bus leading to the dual resonant converters;

an inductor connected in series with the input voltage source and a first diode, the first diode connected to the main bus;

a controllable switch connected between a node where the inductor and the first diode connect and a midpoint of the main bus formed by two capacitors placed in series, the midpoint connected to two second and third diodes, the second diode connected to a first tap on the primary winding of the one transformer and the diode connected to a second tap on the primary winding of the second transformer such that the input voltage may have a limited range while voltage of the main bus and the midpoint is controlled by the controllable switch and the second and third diodes connected to respective taps.

55. A dual resonant forward converter for converting voltage from an input dc voltage source to an output dc voltage for delivery to a load comprising:

two transformers each having a primary and secondary winding wound about a core element in a manner in which the polarities of the windings are matched, each transformer having a magnetizing inductor connected in parallel across one of its windings to provide a respective resonant ring independent of the load, each magnetizing inductor being naturally supplied by a magnetizing inductance of the respective transformer;

two switching means, one connected in series with the primary winding of one transformer and the input dc voltage source for alternately switching current on and off at a rapid rate through a first series circuit, the second switching means connected in series with the primary winding of the second transformer and the input dc voltage source for alternately switching current on and off at a rapid rate through a second series circuit, each switching means causing, when it is turned off, a ring between the respective magnetizing inductor of the transformer to which the switching means is connected and a first capacitor means coupled in parallel thereto with the switching means;

said first series circuit comprising the input dc voltage source, the primary winding of the one transformer, and the one switching means in parallel with the respective first capacitor means;

said second series circuit comprising the input dc voltage source, the primary winding of the second transformer, and the second switching means in parallel with its respective first capacitor means;

a third series circuit comprising the secondary winding of the one transformer in series with a first synchronous rectifier, a common node, a first parallel output capacitor and said load, said first synchronous rectifier having a second capacitor means coupled in parallel therewith such that the first synchronous rectifier acts in unison with the one switching means, both being turned on and off at about the same time, and the first capacitor means of the first series circuit acting in parallel with the second capacitor means during the respective ring;

a gate of the first synchronous rectifier cross coupling to the secondary winding of the second transformer;

a fourth series circuit comprising the secondary winding of the second transformer in series with a second synchronous rectifier, the common node, the first parallel output capacitor, and said load, said second synchronous rectifier having a third capacitor means coupled in parallel therewith such that the second synchronous rectifier acts in unison with the second switching means, both being turned on and off at about the same time, the first capacitor means of the second series circuit acting in parallel with the third capacitor means during the respective ring; and a gate of the second synchronous rectifier cross coupling to the secondary winding of the one transformer, the first and second synchronous rectifiers providing a reduction in conduction losses.

56. A dual resonant forward converter for converting voltage from an input dc voltage source to an output dc voltage for delivery to a load comprising:

two transformers each having a primary and secondary winding wound about a core element in a manner in which the polarities of the windings are matched, each transformer having a magnetizing inductor connected in parallel across one of its windings to provide a respective resonant ring independent of the supplied by a magnetizing inductance of the respective transformer;

two switching means, one connected in series with the primary winding of one transformer and the input dc voltage source for alternately switching current on and off at a rapid rate through a first series circuit, the second switching means connected in series with the primary winding of the second transformer and the input dc voltage source for alternately switching current on and off at a rapid rate through a second series circuit, each switching means causing, when it is turned off, a ring between the respective magnetizing inductor of the transformer to which the switching means is connected and a first capacitor means coupled in parallel thereto with the switching means;

said first series circuit comprising the input dc voltage source, the primary winding of the one transformer, and the one switching means in parallel with the respective first capacitor means;

said second series circuit comprising the input dc voltage source, the primary winding of the second transformer, and the second switching means in parallel with its respective first capacitor means;

a third series circuit comprising the secondary winding of the one transformer in series with a first unidirectional conducting means, a common node, a first parallel output capacitor and said load, said first unidirectional conducting means having a second capacitor means coupled in parallel therewith such that the first unidirectional conducting means acts in unison with the one switching means, both being turned on and off at about the same time, and the first capacitor means of the first series circuit acting in parallel with the second capacitor means during the respective ring;

a fourth series circuit comprising the secondary winding of the second transformer in series with a second unidirectional conducting means, the common node, the first parallel output capacitor, and said load, said second unidirectional conducting means having a third capacitor means coupled in parallel therewith such that the second unidirectional means acts in unison with the second switching means, both being turned on and off at about the same time, the first capacitor means of the second series circuit acting in parallel with the third capacitor means during the respective ring; and circuit means for pre-regulating the voltage presented to the first and second series circuits.

57. A dual resonant forward converter as claimed in claim 56 wherein the circuit means for pre-regulating the input voltage includes:

a main bus leading to the dual resonant converter;

an inductor connected in series with the input voltage source and a first diode, the first diode connected to the main bus, a node being formed where the inductor and the first diode connect;

a controllable switch connected between the node and a midpoint of the main bus formed by two capacitors placed in series, the midpoint connected to second and third diodes, the second diode connected to a first tap on the primary winding of the one transformer and the third diode connected to a second tap on the primary winding of the second transformer such that the input voltage may have a limited range while voltage of the main bus and midpoint is controlled by the controllable switch and the second and third diodes.

58. A resonant forward converter for converting voltage from an input dc voltage source to an output dc voltage for delivery to a load comprising:

a transformer having a primary and secondary winding wound about a common core element in which the polarities of the windings are matched, said transformer having a magnetizing inductor connected in parallel across one of said windings to provide a resonant ring independent of the load, the magnetizing inductor being naturally supplied by a magnetizing inductance of the transformer;

switching means connected in series with said primary winding and said input dc voltage source for alternately switching current on and off at a rapid rate through a first series circuit, said switching means causing, when it is turned off, a ring between the magnetizing inductor and a first capacitor means coupled in parallel with the switching means; said first series circuit comprising the input dc voltage source, the primary winding of said transformer and the switching means in parallel with said first capacitor means;

a second series circuit comprising said secondary winding of the transformer in series with a first unilateral conducting means, a parallel output capacitor and said load, said first unilateral conducting means having a second capacitor means coupled in parallel therewith, such that the first unilateral conducting means acts in unison with the switching means, both being turned on at about the same time and off at about the same time, the second capacitor means acting in parallel with the first capacitor means during the resonant ring; and circuit means for pre-regulating voltage presented to the first series circuit.

59. A resonant forward converter as claimed in claim 58 wherein the circuit means for pre-regulating the input voltage includes:

a main bus leading to the resonant forward converter;

an inductor connected in series with the input voltage source and a first diode, the first diode connected to the main bus, a node being formed where the inductor and the first diode connect;

a controllable switch connected between the node and a midpoint of the main bus, the midpoint formed by two capacitors placed in series; and a unidirectional conducting means connected in series with the midpoint and a tap on the primary winding of the transformer such that the input voltage has a limited range while voltage of the main bus and the midpoint is controlled by the controllable switch and unidirectional conducting means.

60. A resonant forward converter as claimed in claim 59 wherein the unidirectional conducting means of the pre-regulating circuit includes a second diode.

61. A resonant forward converter for converting voltage from an input dc voltage source to an output dc voltage for delivery to a load comprising:

a transformer having a primary and secondary winding wound about a common core element in which the polarities of the windings are matched, said transformer having a magnetizing inductor connected in parallel across one of said windings to provide a resonant ring independent of the load, the magnetizing inductor being naturally supplied by a magnetizing inductance of the transformer;

switching means connected in series with said primary winding and said input dc voltage source for alternately switching current on and off at a rapid rate through a first series circuit, said switching means causing, when it is turned off, a ring between the magnetizing inductor and a first capacitor means coupled in parallel with the switching means; said first series circuit comprising the input dc voltage source, the primary winding of said transformer and the switching means in parallel with said first capacitor means;

a second series circuit comprising said secondary winding of the transformer in series with a first unilateral conducting means, a parallel output capacitor and said load, said first unilateral conducting means having a second capacitor means coupled in parallel therewith, such that the first unilateral conducting means acts in unison with the switching means, both being turned on at about the same time and off at about the same time, the second capacitor means acting in parallel with the first capacitor means during the resonant ring;

a leakage inductor connected in a series with one of the windings of the transformer, the leakage inductor being naturally supplied by leakage inductance of the transformer which is negligibly small relative to the magnetizing inductance such the first unilateral conducting means and the switching means both have zero voltage switching transitions; and circuit means for pre-regulating the voltage presented to the first series circuit.

62. A resonant forward converter as claimed in claim 61 wherein the circuit means for pre-regulating the input voltage includes:
  a main bus leading to the resonant forward converter;
  an inductor connected in series with the input voltage source and a first diode, the first diode connected to the main bus, a node being formed where the inductor and the first diode connect;
  a controllable switch connected between the node and a midpoint of the main bus, the midpoint formed by two capacitors placed in series; and
  a unidirectional conducting means connected in series with the midpoint and a tap on the primary winding of the transformer such that the input voltage may have a limited range while the voltage of the main bus and the midpoint is controlled by the controllable switch and the unidirectional conducting means.

63. A resonant forward converter as claimed in claim 62 wherein the unidirectional conducting means of the circuit means for pre-regulating the input voltage includes a second diode.

* * * * *

UNITED STATES PATENT AND TRADEMARK OFFICE
CERTIFICATE OF CORRECTION

PATENT NO. : 4,788,634
DATED : November 29, 1988
INVENTOR(S) : Martin F. Schlecht and Leo F. Casey It is certified that error appears in the above-identified patent and that said Letters Patent is hereby corrected as shown below:

Column 18, line 6, change "inductopr" to read ---inductor---.
Column 21, line 6, change "thge" to read ---the---.

Column 28, line 37, after "the", insert ---load, each magnetizing inductor being naturally---.

Signed and Sealed this

Twentieth Day of June, 1989

Attest:

DONALD J. QUIGG

Attesting Officer

Commissioner of Patents and Trademarks